Feb. 9, 1943.  S. L. G. KNOX  2,310,462
VERTICAL CONVEYER SYSTEM
Filed Sept. 20, 1941  28 Sheets-Sheet 1
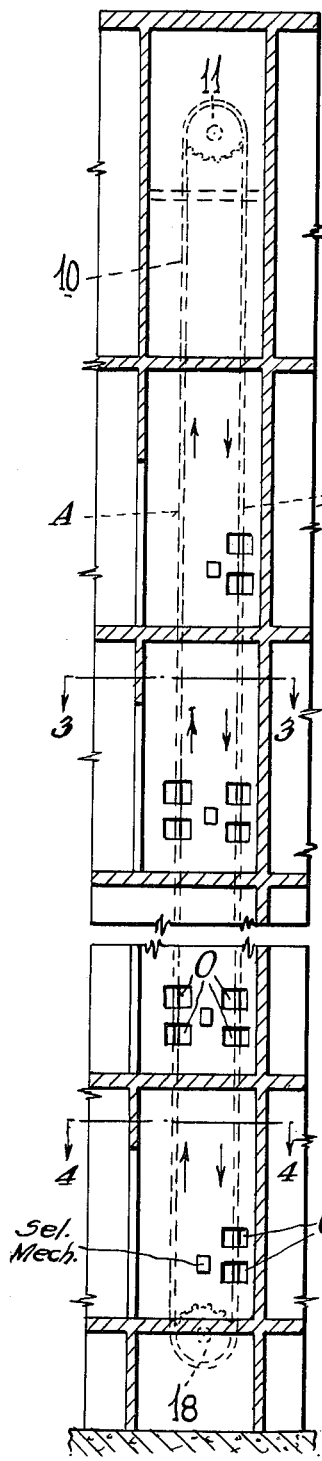
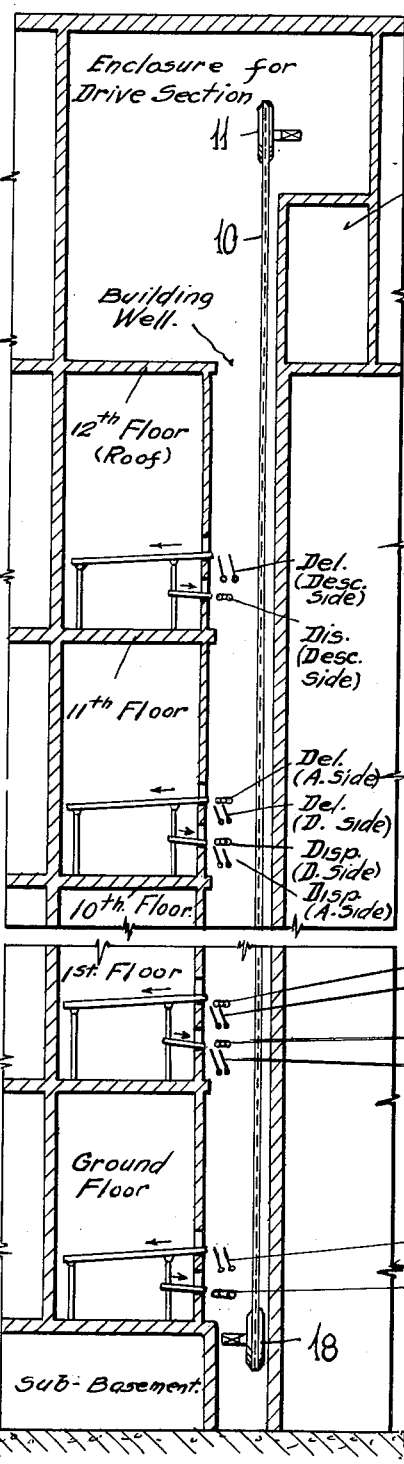
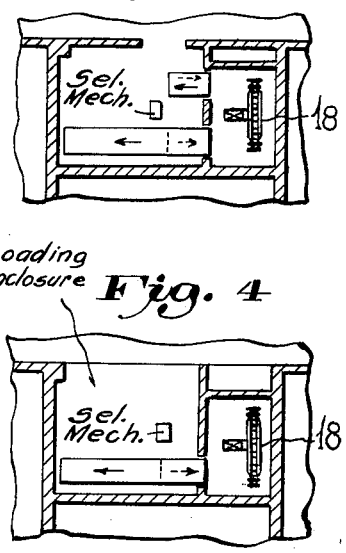
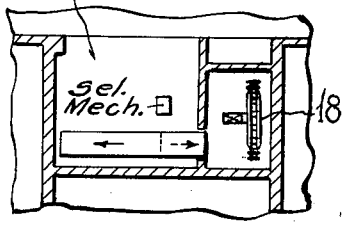
INVENTOR.
S. L. G. Knox,
BY
ATTORNEYS Feb. 9, 1943.   S. L. G. KNOX   2,310,462
VERTICAL CONVEYER SYSTEM
Filed Sept. 20, 1941   28 Sheets-Sheet 2

INVENTOR.
S. L. G. Knox,
BY
ATTORNEYS

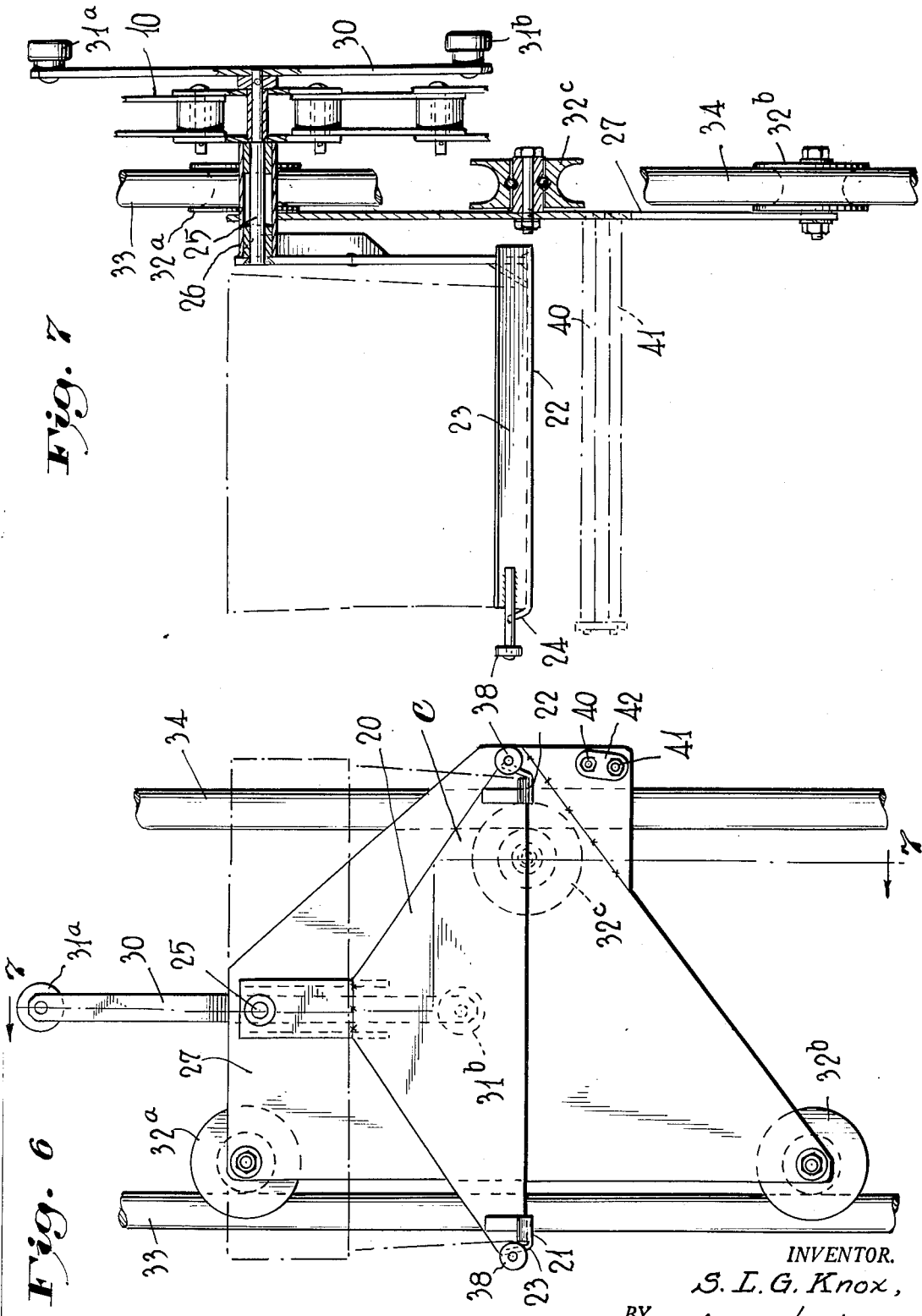

Feb. 9, 1943. S. L. G. KNOX 2,310,462
VERTICAL CONVEYER SYSTEM
Filed Sept. 20, 1941 28 Sheets-Sheet 4
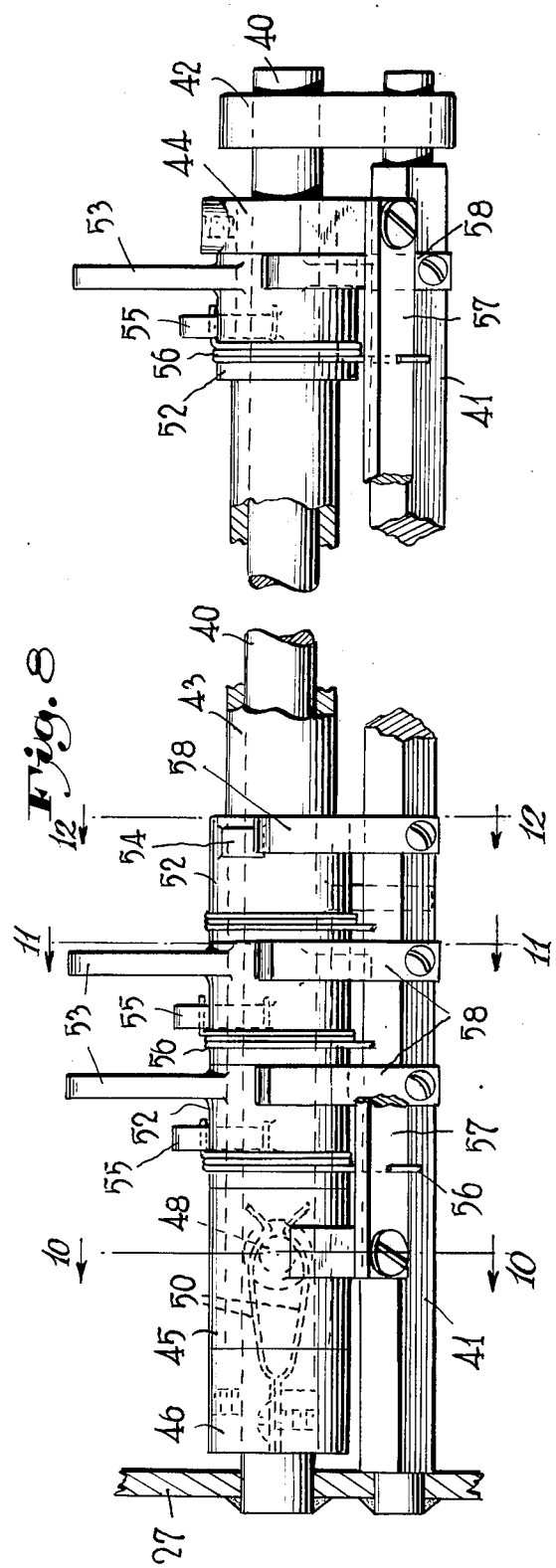
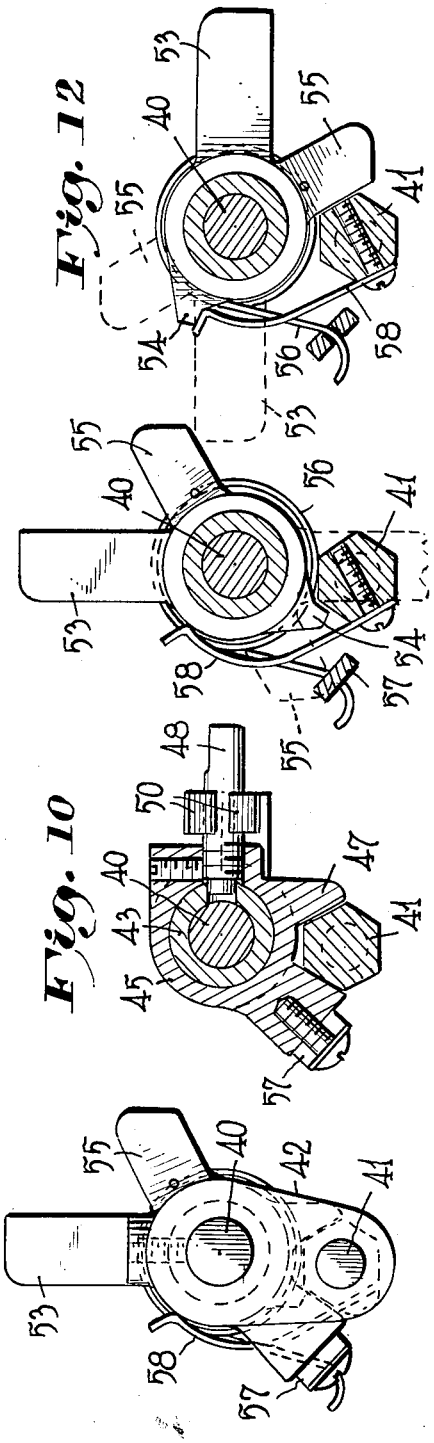
INVENTOR.
S. L. G. Knox,
BY
ATTORNEYS

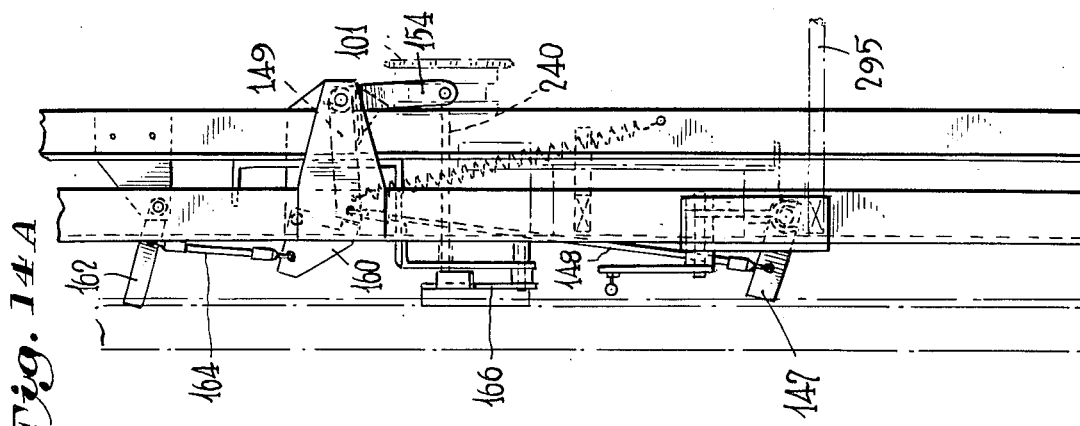
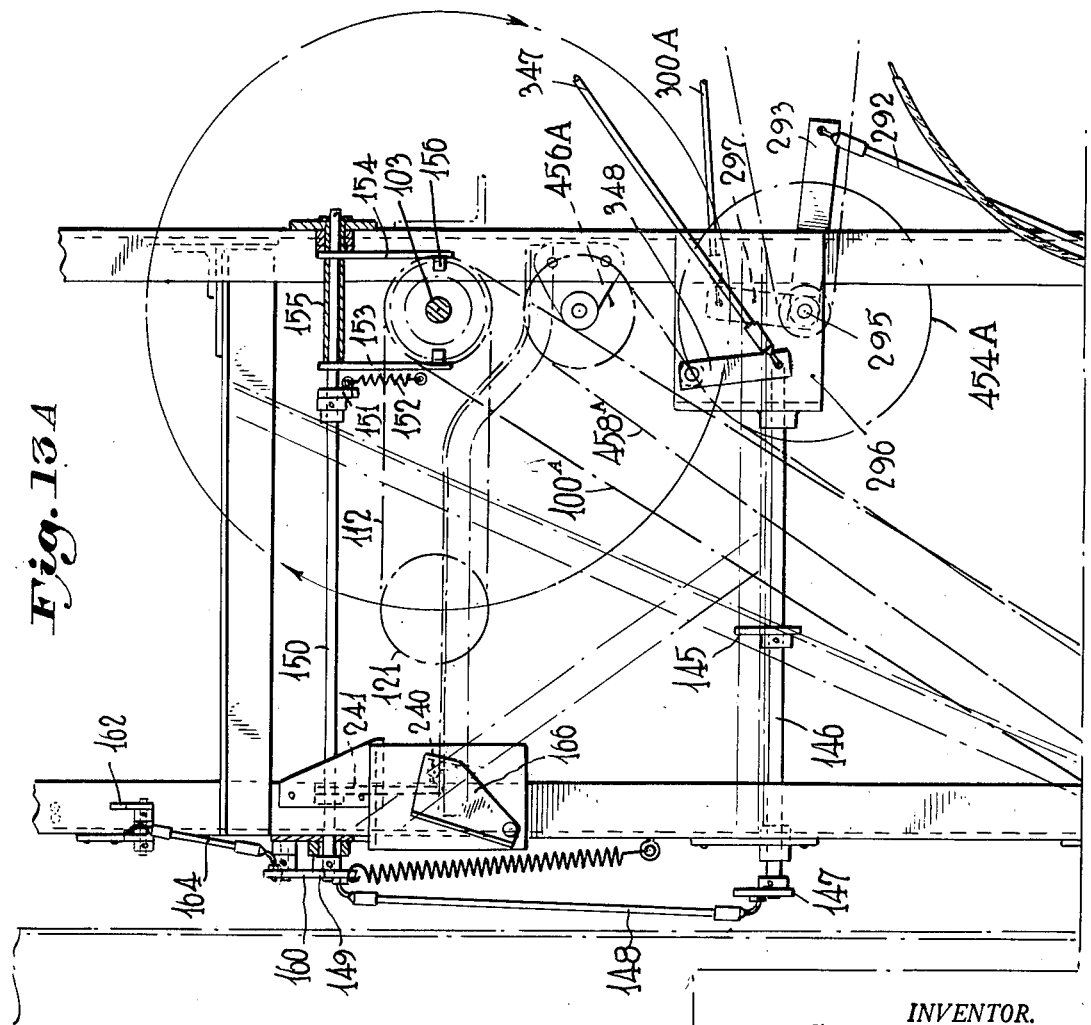

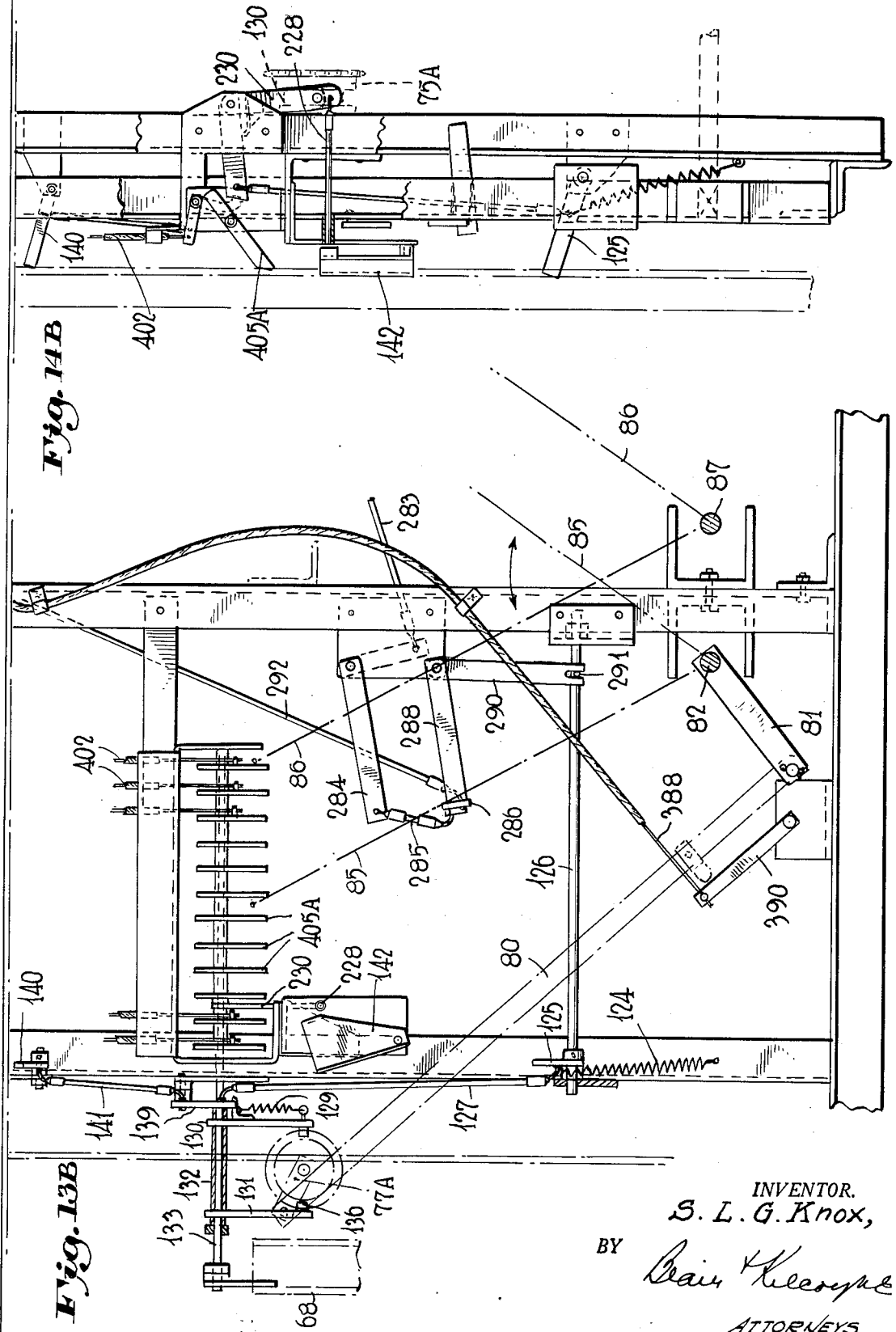

Feb. 9, 1943.  S. L. G. KNOX  2,310,462
VERTICAL CONVEYER SYSTEM
Filed Sept. 20, 1941  28 Sheets-Sheet 7
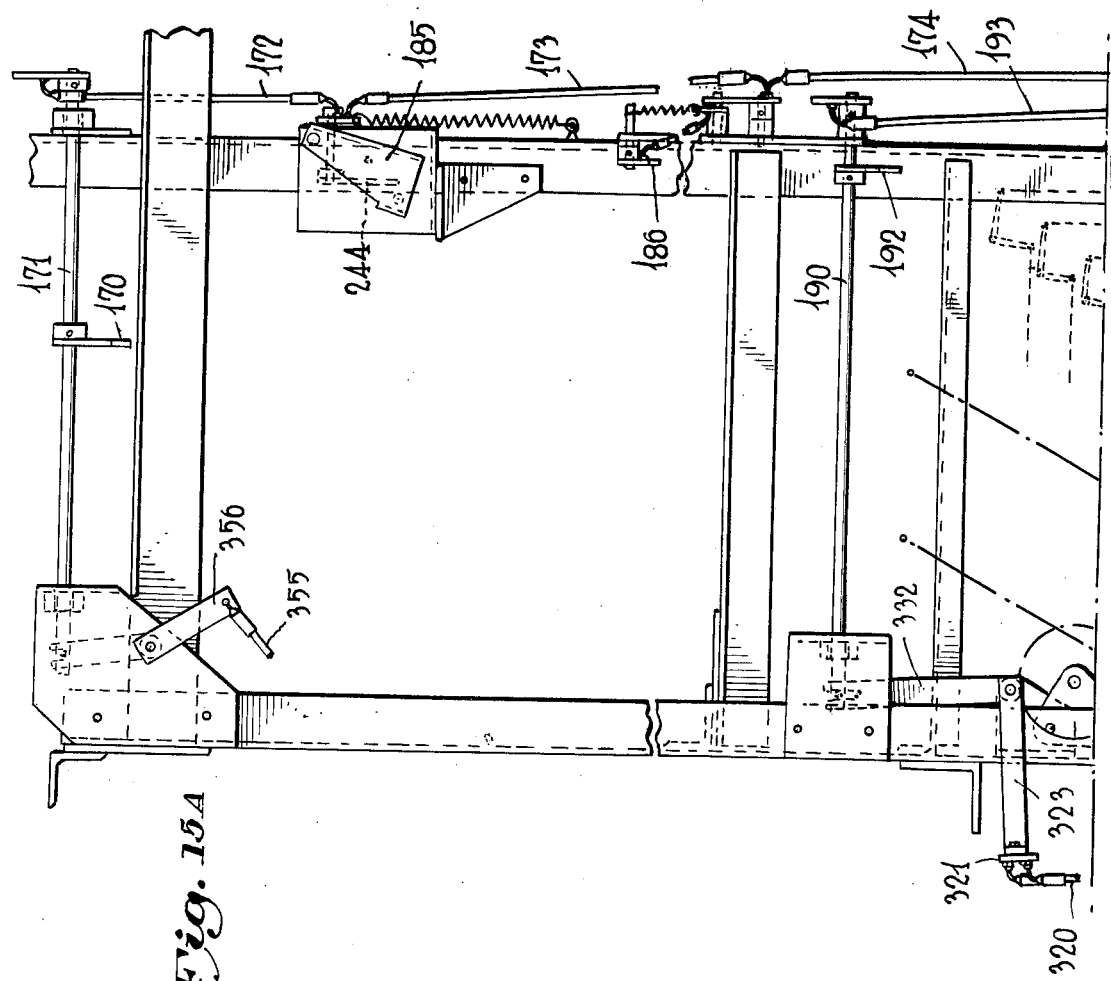
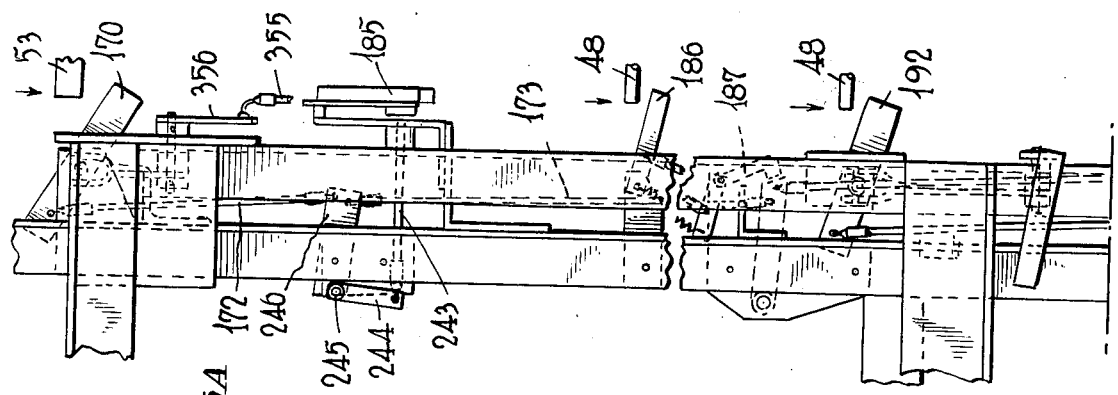
INVENTOR.
S. L. G. Knox,
BY
ATTORNEYS

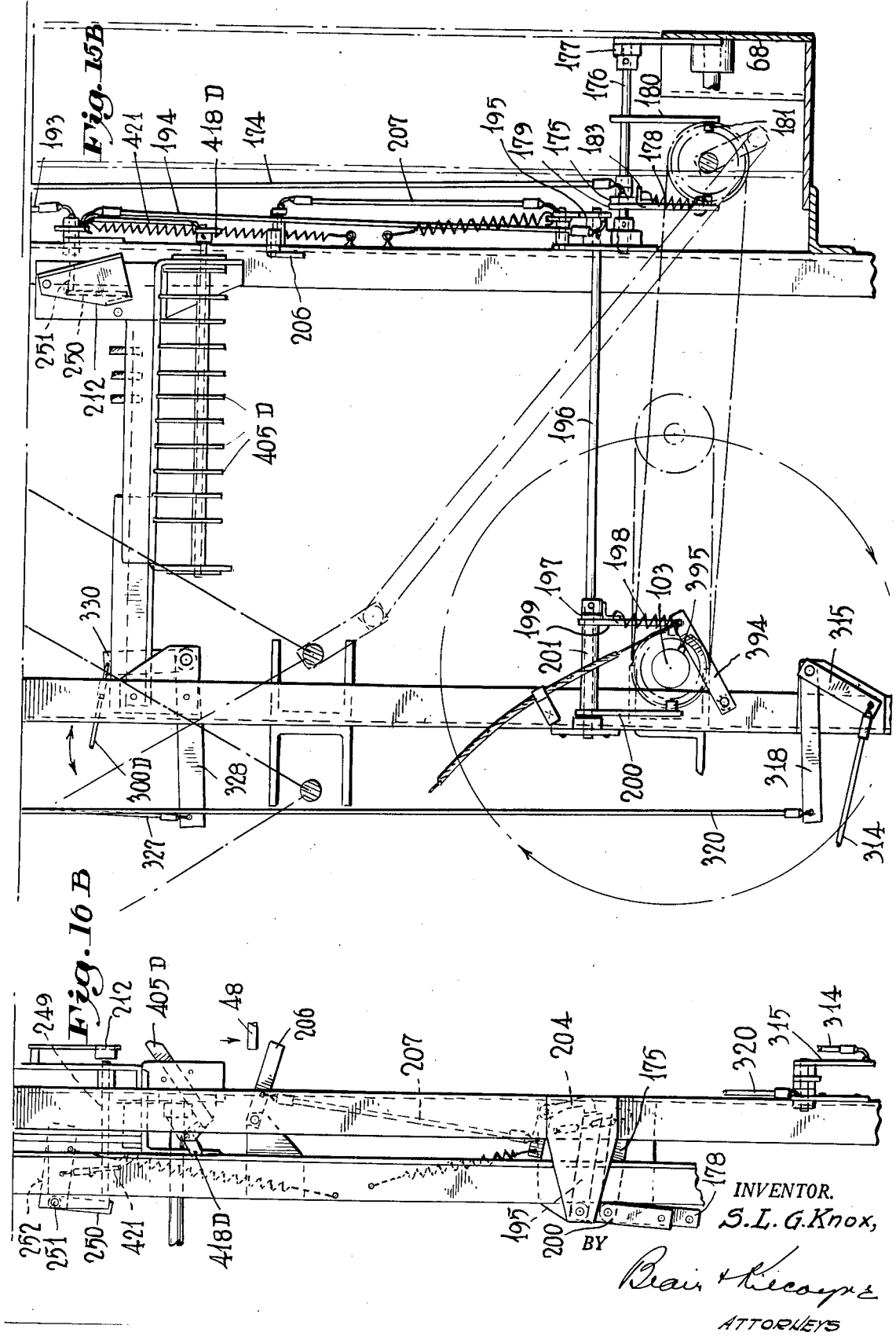

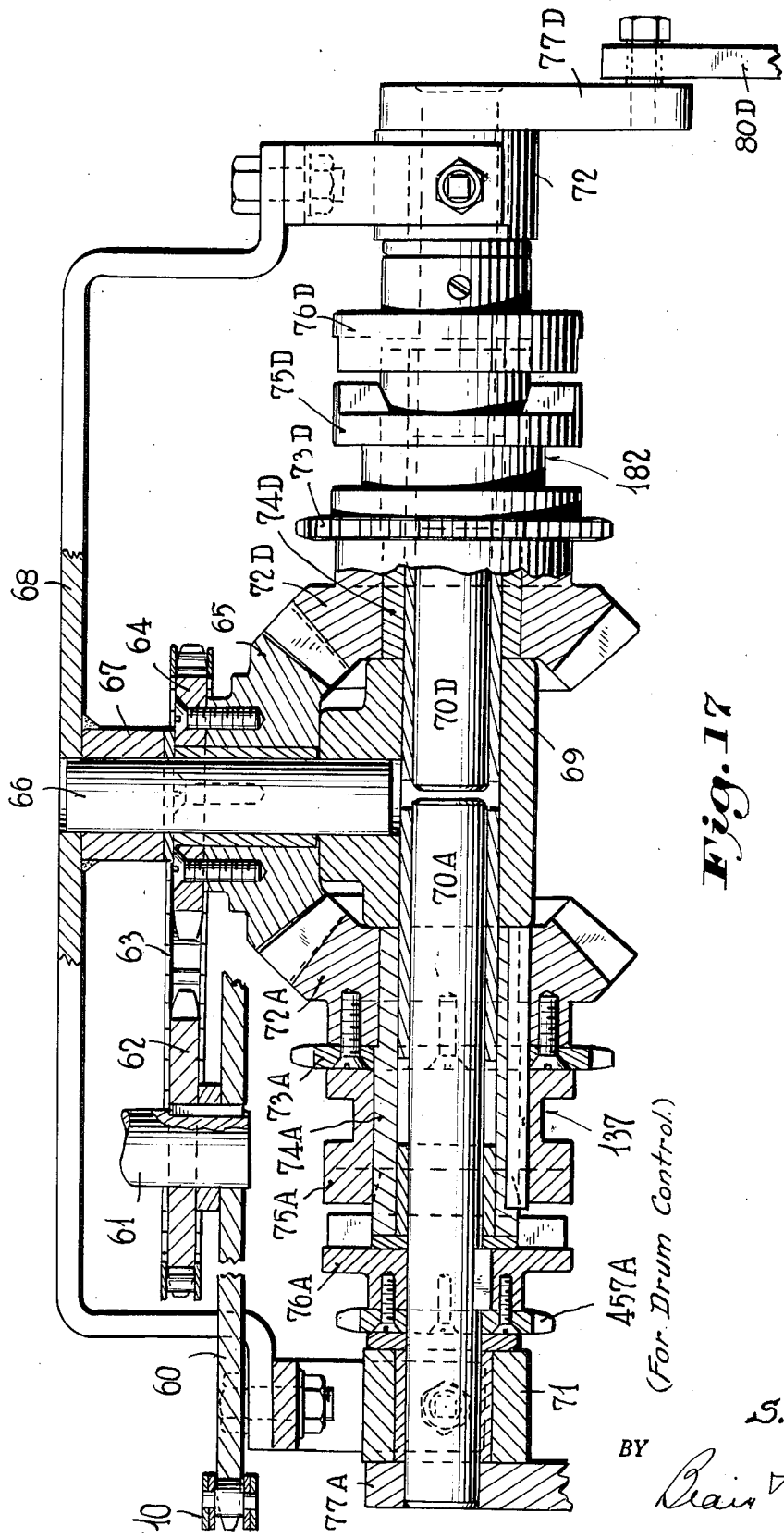

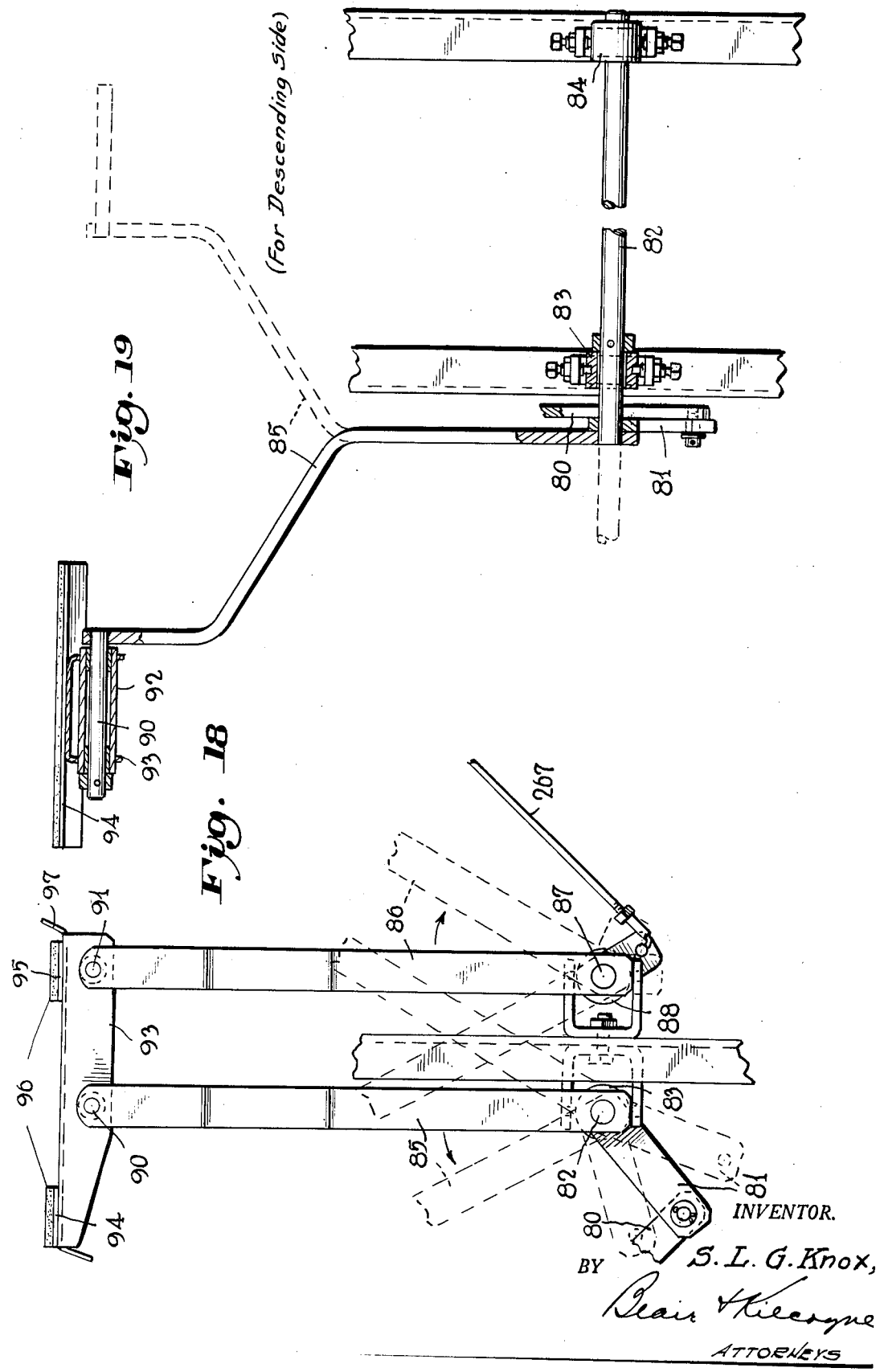

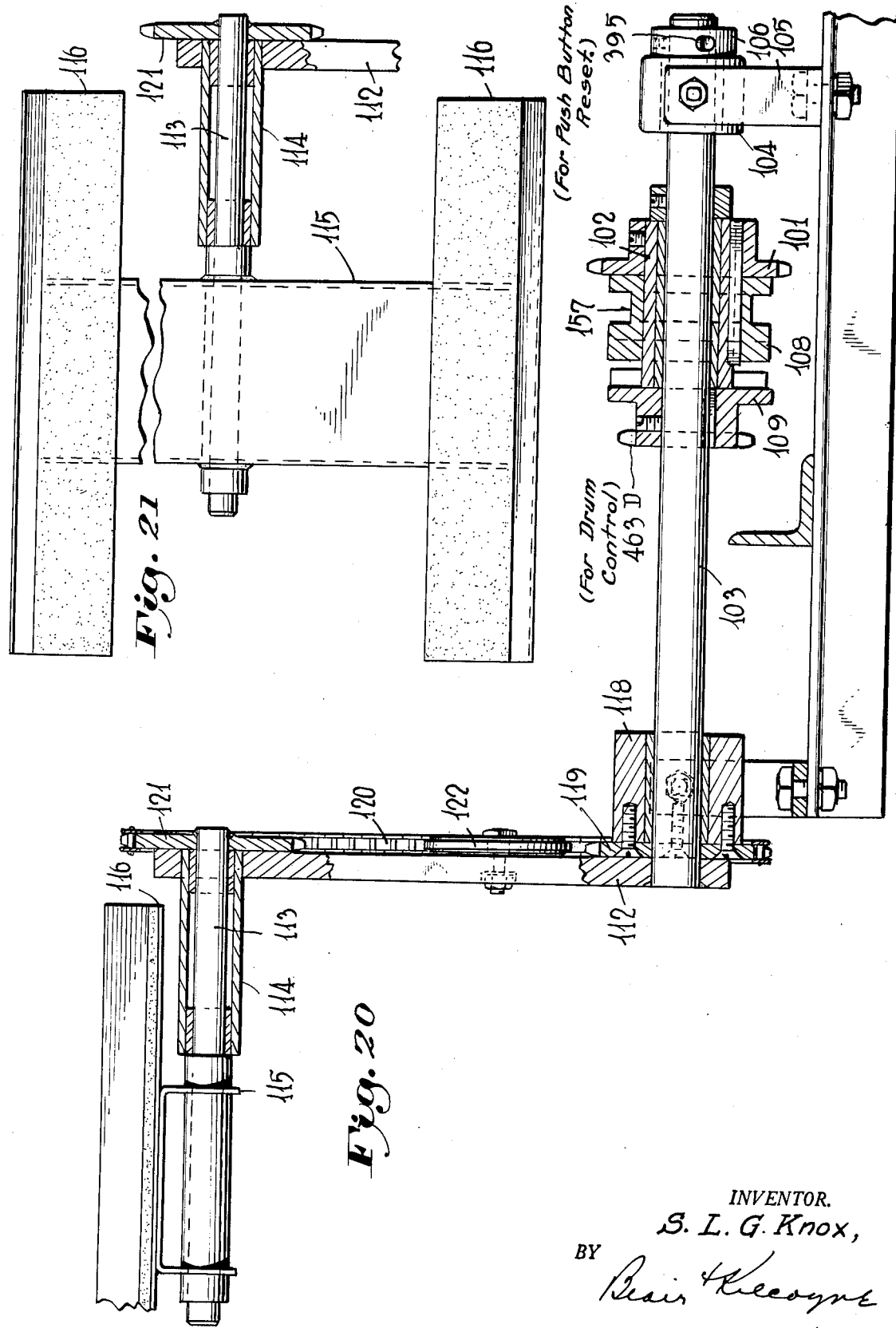

Feb. 9, 1943. S. L. G. KNOX 2,310,462
VERTICAL CONVEYER SYSTEM
Filed Sept. 20, 1941 28 Sheets-Sheet 12

INVENTOR.
S. L. G. Knox,
BY
ATTORNEYS

Feb. 9, 1943.   S. L. G. KNOX   2,310,462
VERTICAL CONVEYER SYSTEM
Filed Sept. 20, 1941   28 Sheets-Sheet 13
Fig. 24
Fig. 25
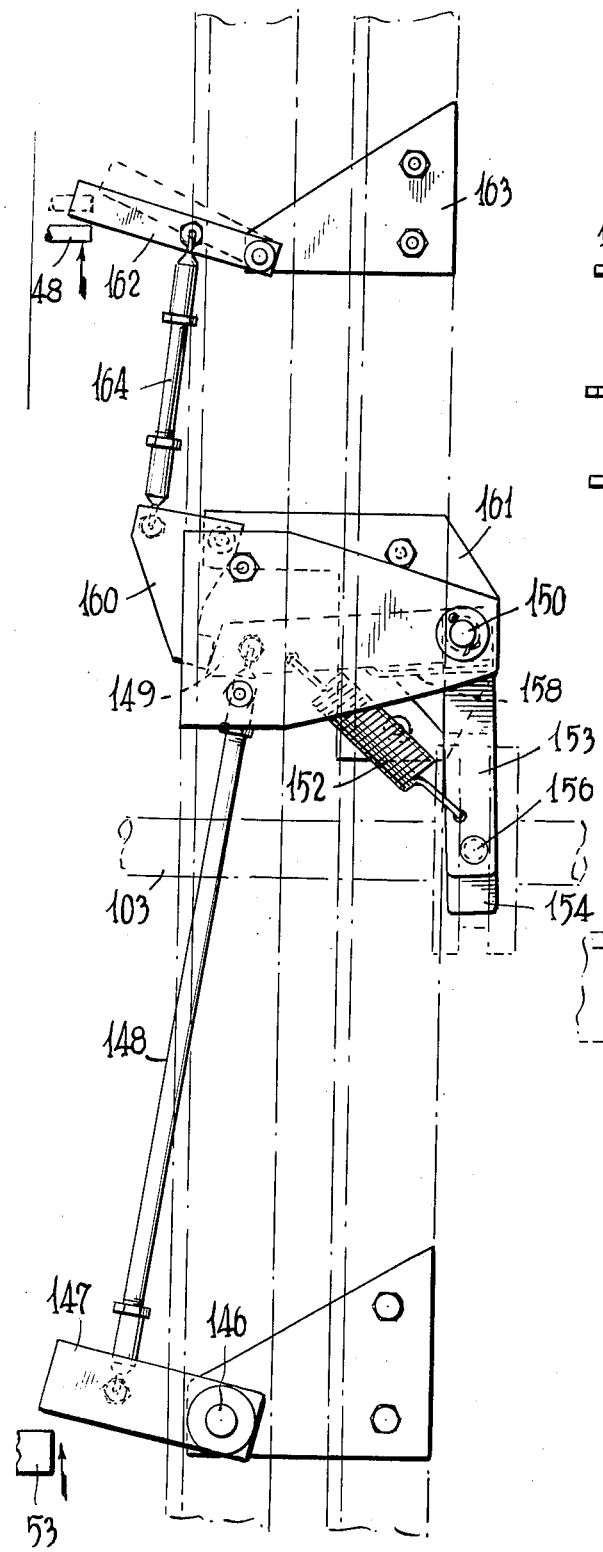
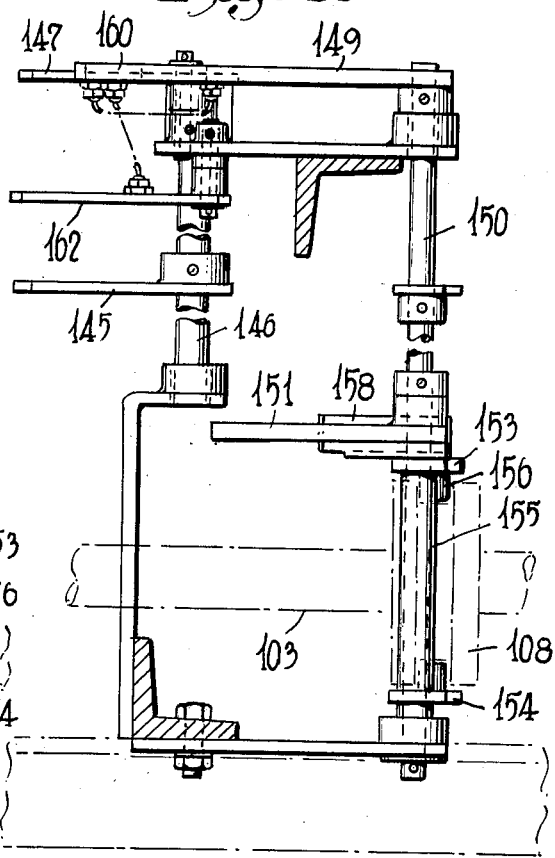
INVENTOR.
S. L. G. Knox,
BY
ATTORNEYS Feb. 9, 1943.  S. L. G. KNOX  2,310,462
VERTICAL CONVEYER SYSTEM
Filed Sept. 20, 1941   28 Sheets-Sheet 14
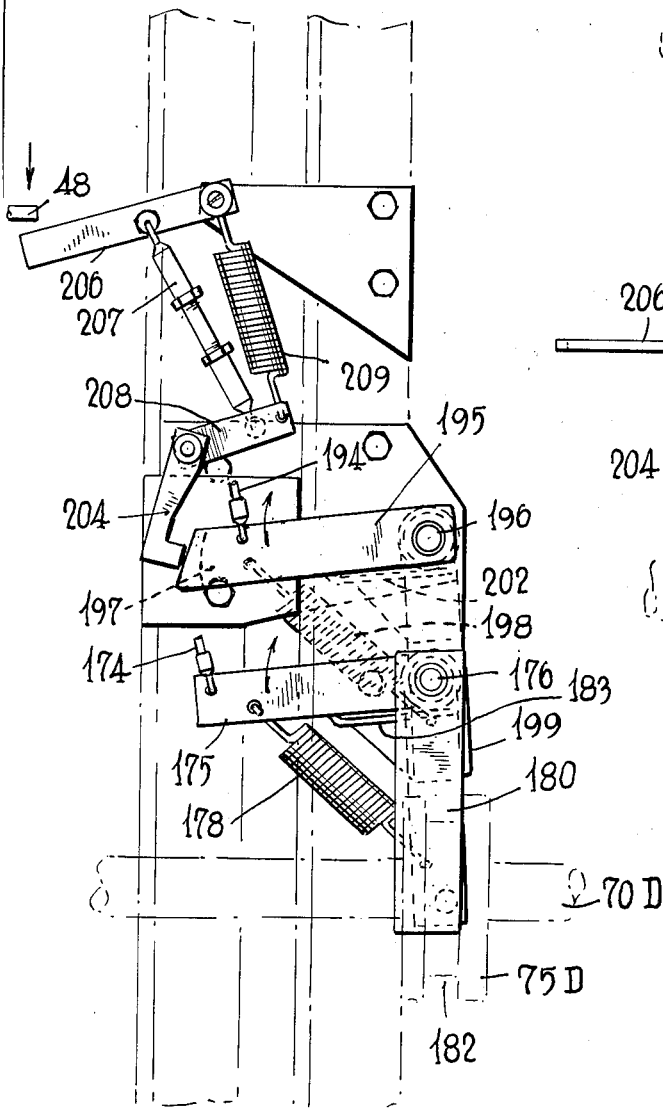
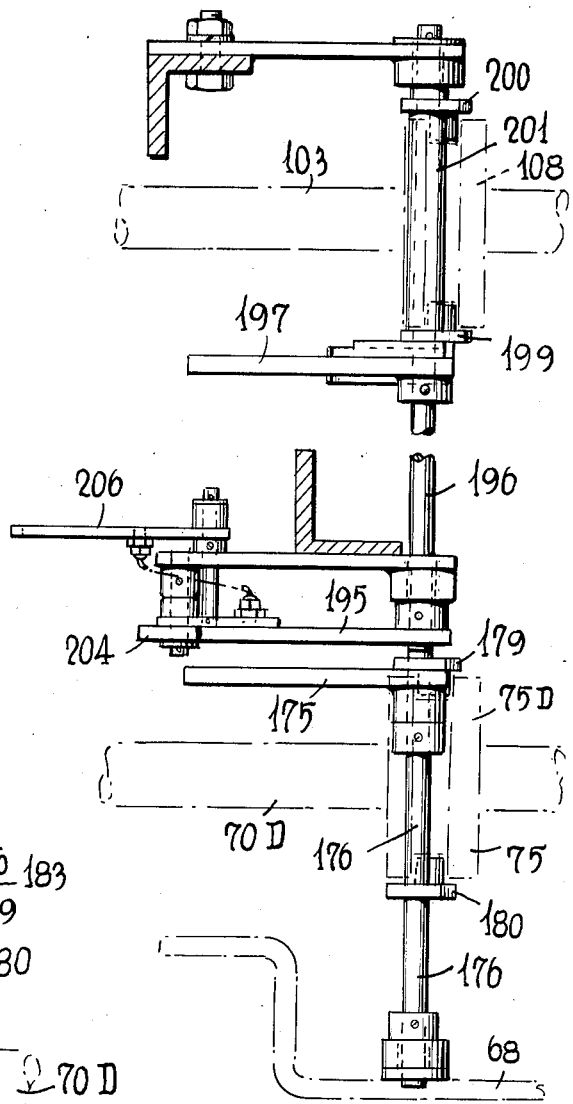
INVENTOR.
S. L. G. Knox,
BY
ATTORNEYS Feb. 9, 1943.        S. L. G. KNOX        2,310,462
VERTICAL CONVEYER SYSTEM
Filed Sept. 20, 1941        28 Sheets-Sheet 15

INVENTOR.
S. L. G. Knox,
BY
ATTORNEYS

Feb. 9, 1943. S. L. G. KNOX 2,310,462
VERTICAL CONVEYER SYSTEM
Filed Sept. 20, 1941 28 Sheets-Sheet 16

INVENTOR.
S. L. G. Knox,
BY
ATTORNEYS

Feb. 9, 1943.　　　S. L. G. KNOX　　　2,310,462
VERTICAL CONVEYER SYSTEM
Filed Sept. 20, 1941　　　28 Sheets-Sheet 17
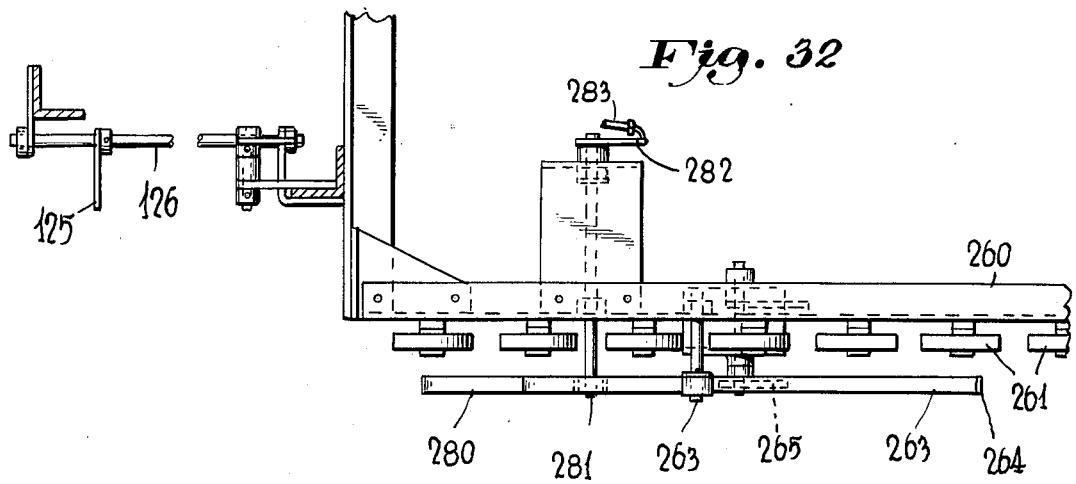
Fig. 32
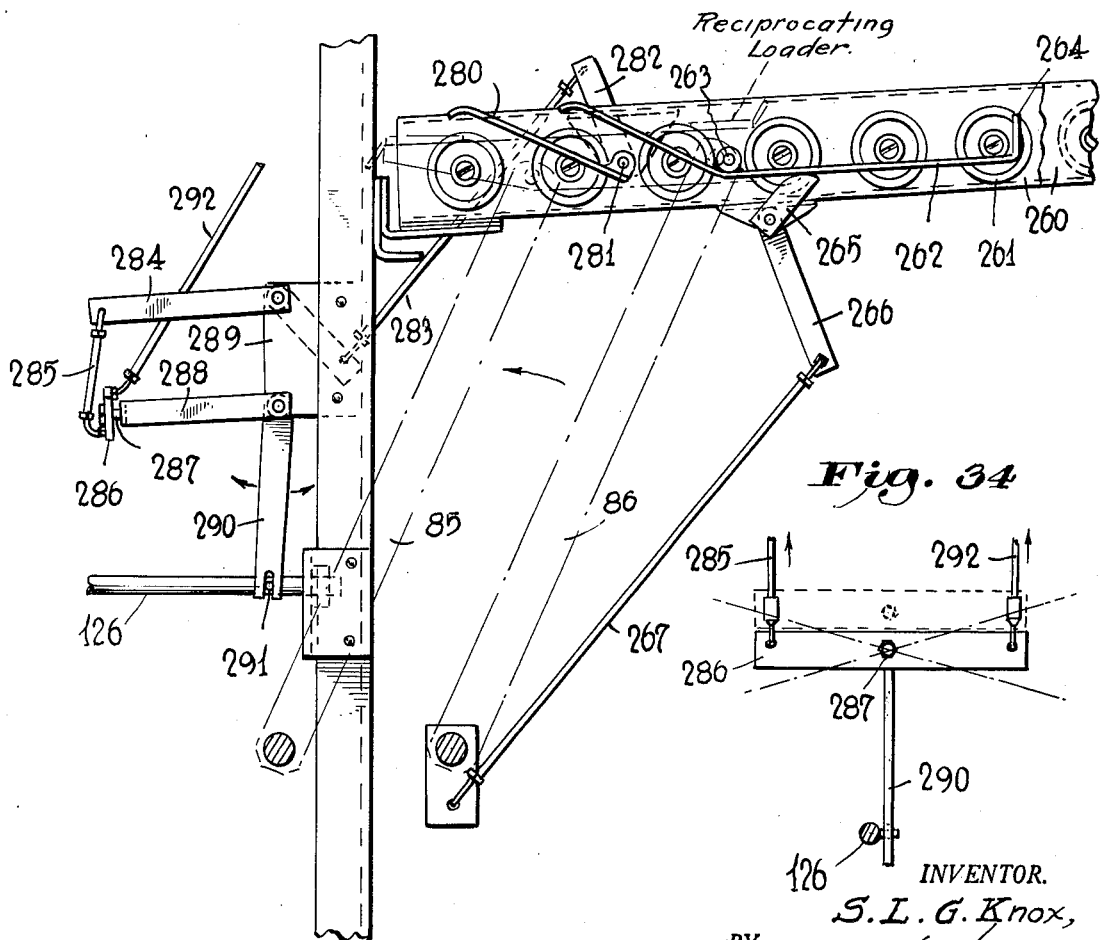
Fig. 33
Fig. 34
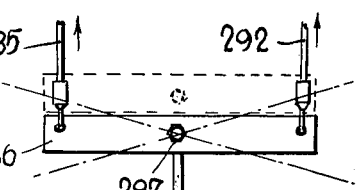
INVENTOR.
S. L. G. Knox,
BY
ATTORNEYS

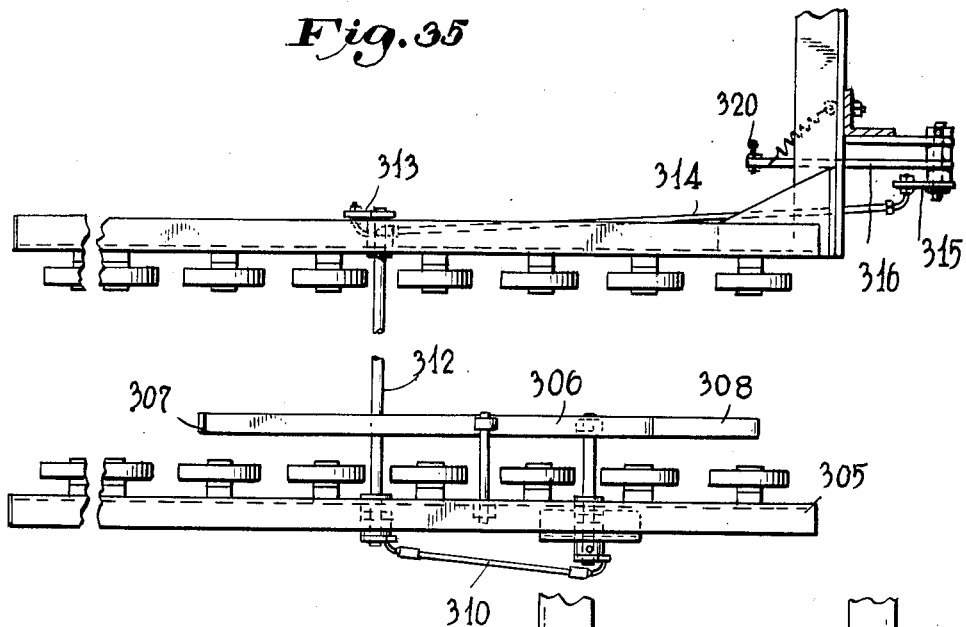
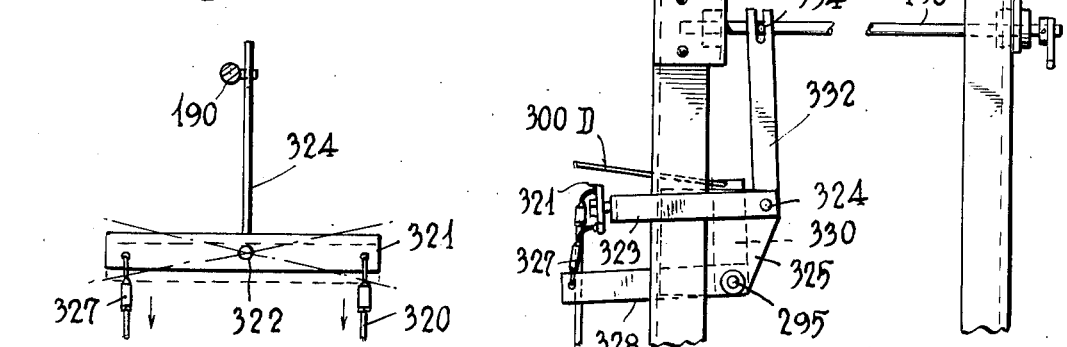
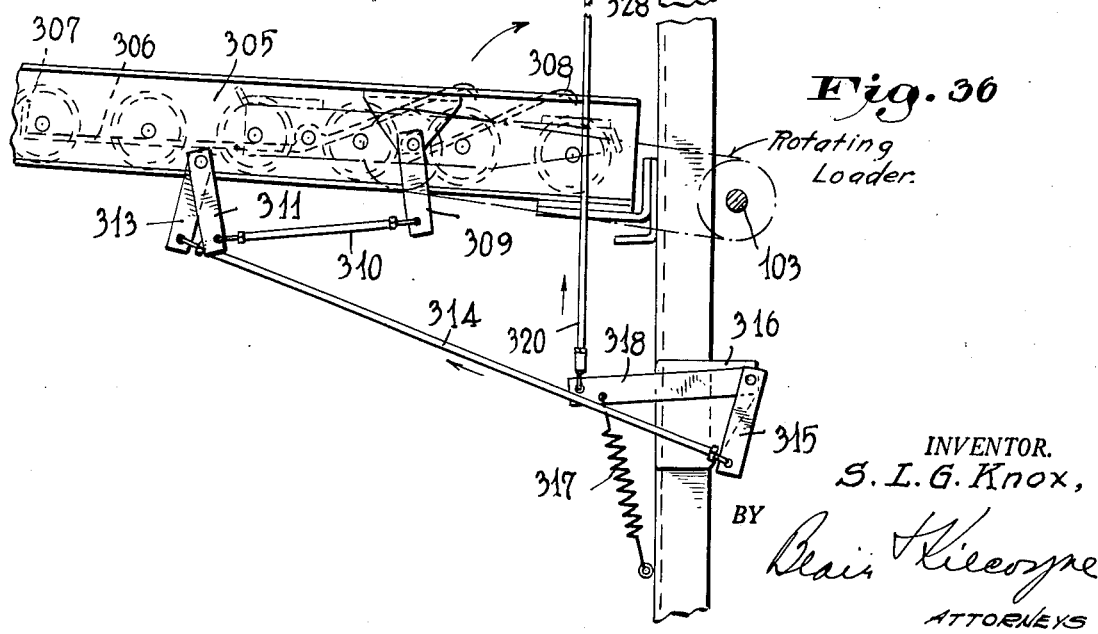

Feb. 9, 1943.   S. L. G. KNOX   2,310,462
VERTICAL CONVEYER SYSTEM
Filed Sept. 20, 1941   28 Sheets—Sheet 19
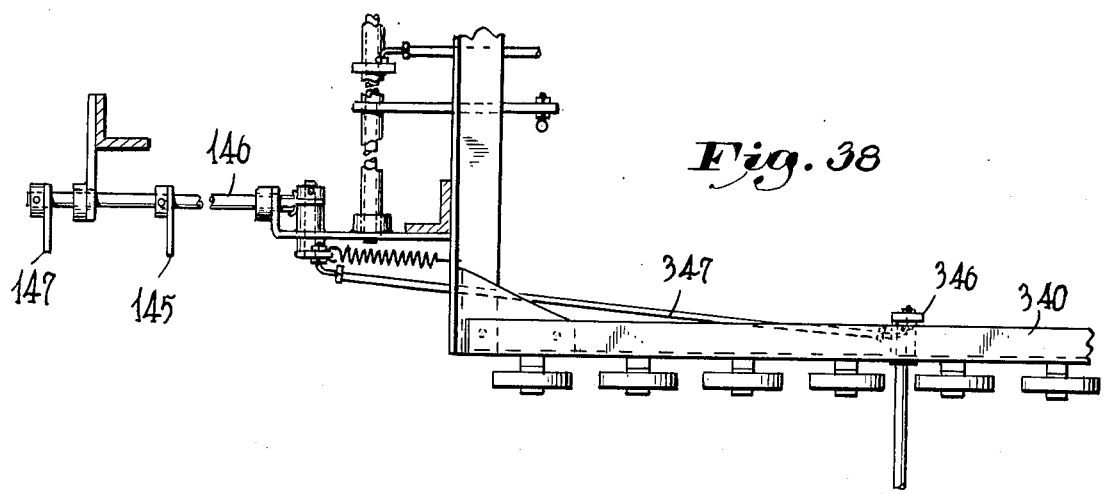
Fig. 38
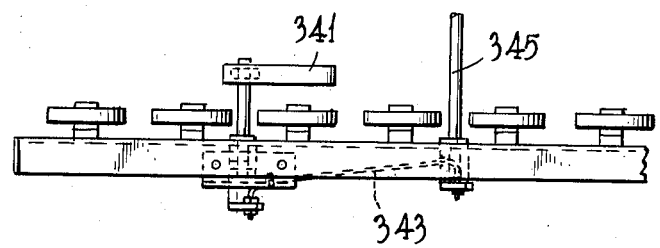
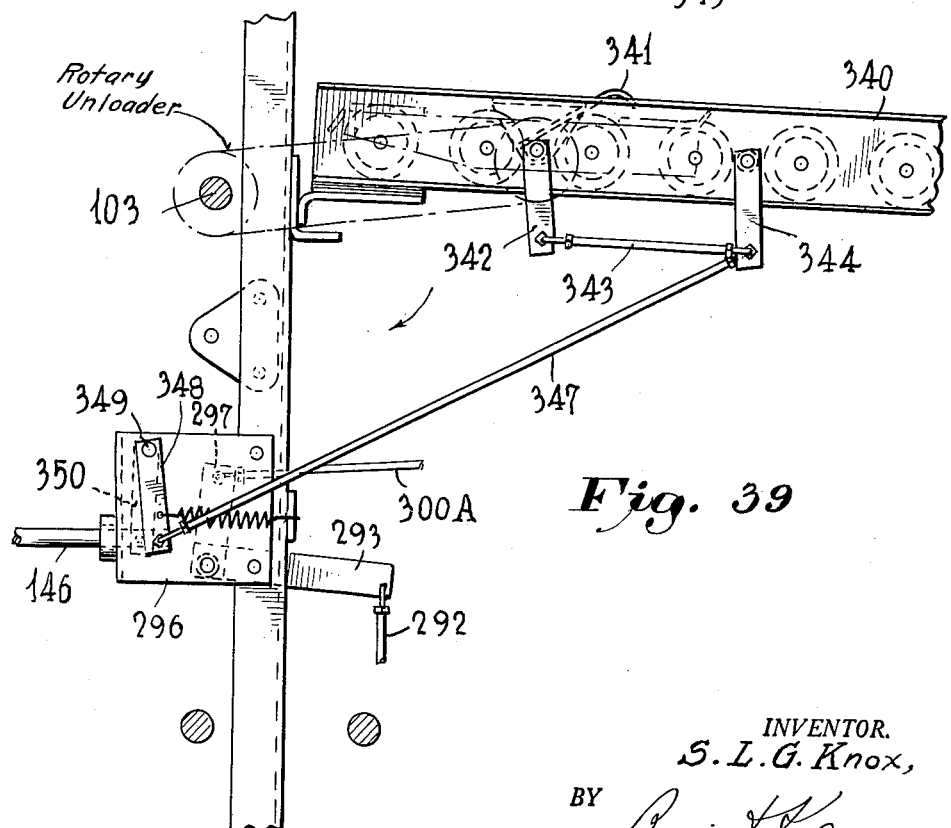
Fig. 39
INVENTOR.
S. L. G. Knox,
BY
ATTORNEYS Feb. 9, 1943. S. L. G. KNOX 2,310,462
VERTICAL CONVEYER SYSTEM
Filed Sept. 20, 1941 28 Sheets-Sheet 20

INVENTOR.
S. L. G. Knox,

Feb. 9, 1943.  S. L. G. KNOX  2,310,462
VERTICAL CONVEYER SYSTEM
Filed Sept. 20, 1941  28 Sheets-Sheet 21
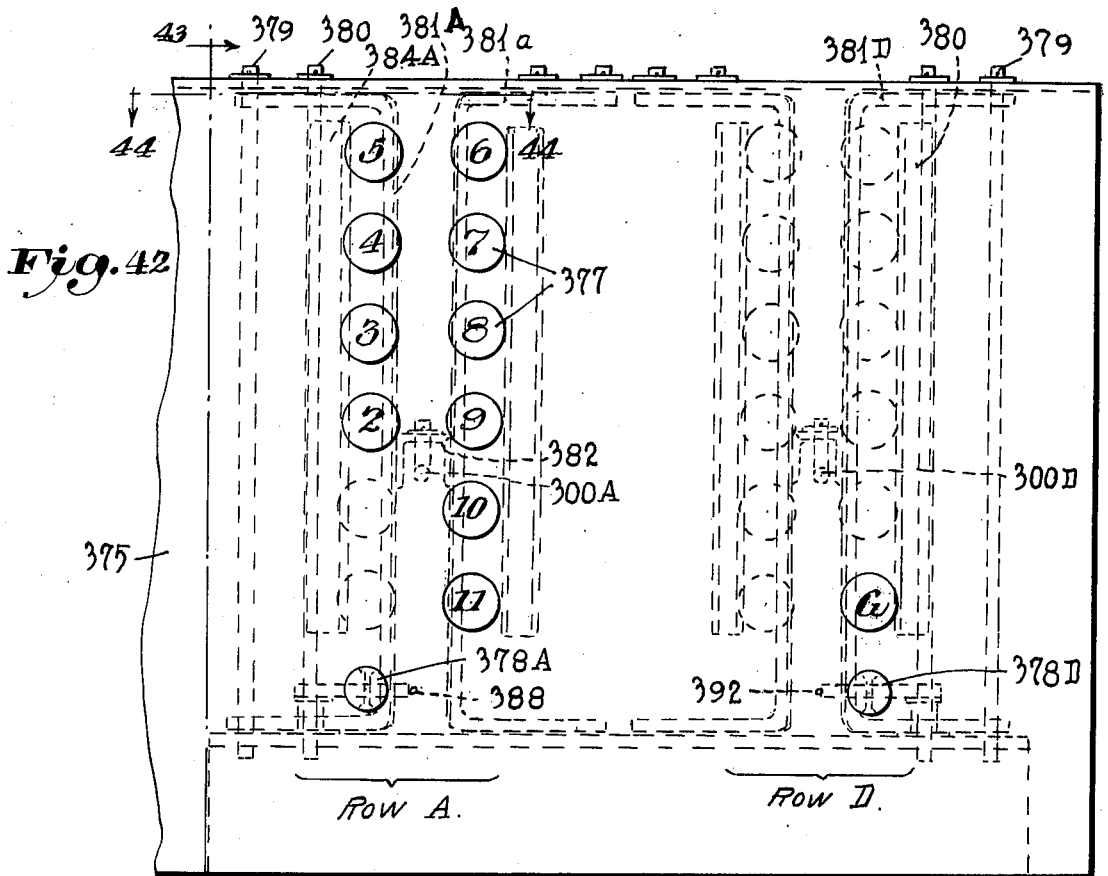
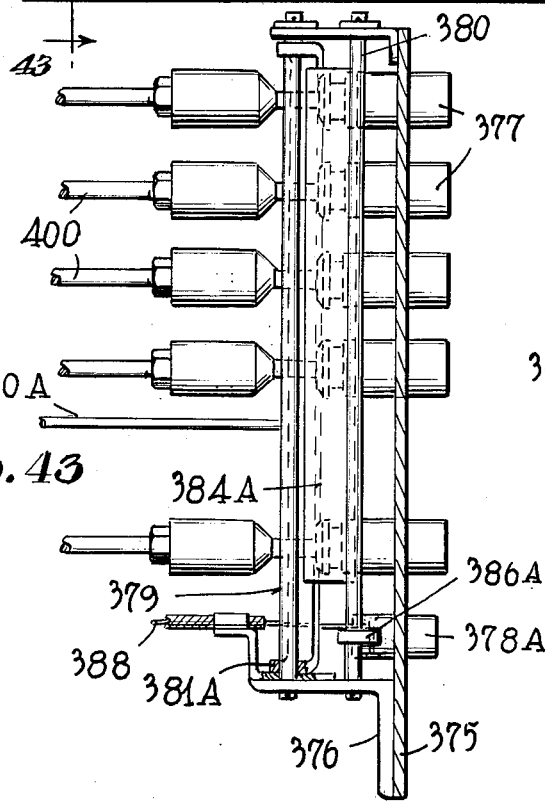
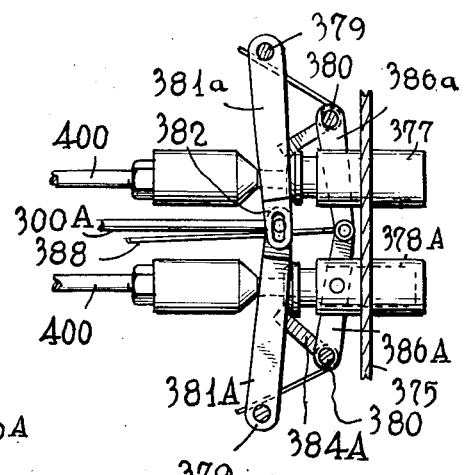
INVENTOR.
S. L. G. Knox,
BY
ATTORNEYS

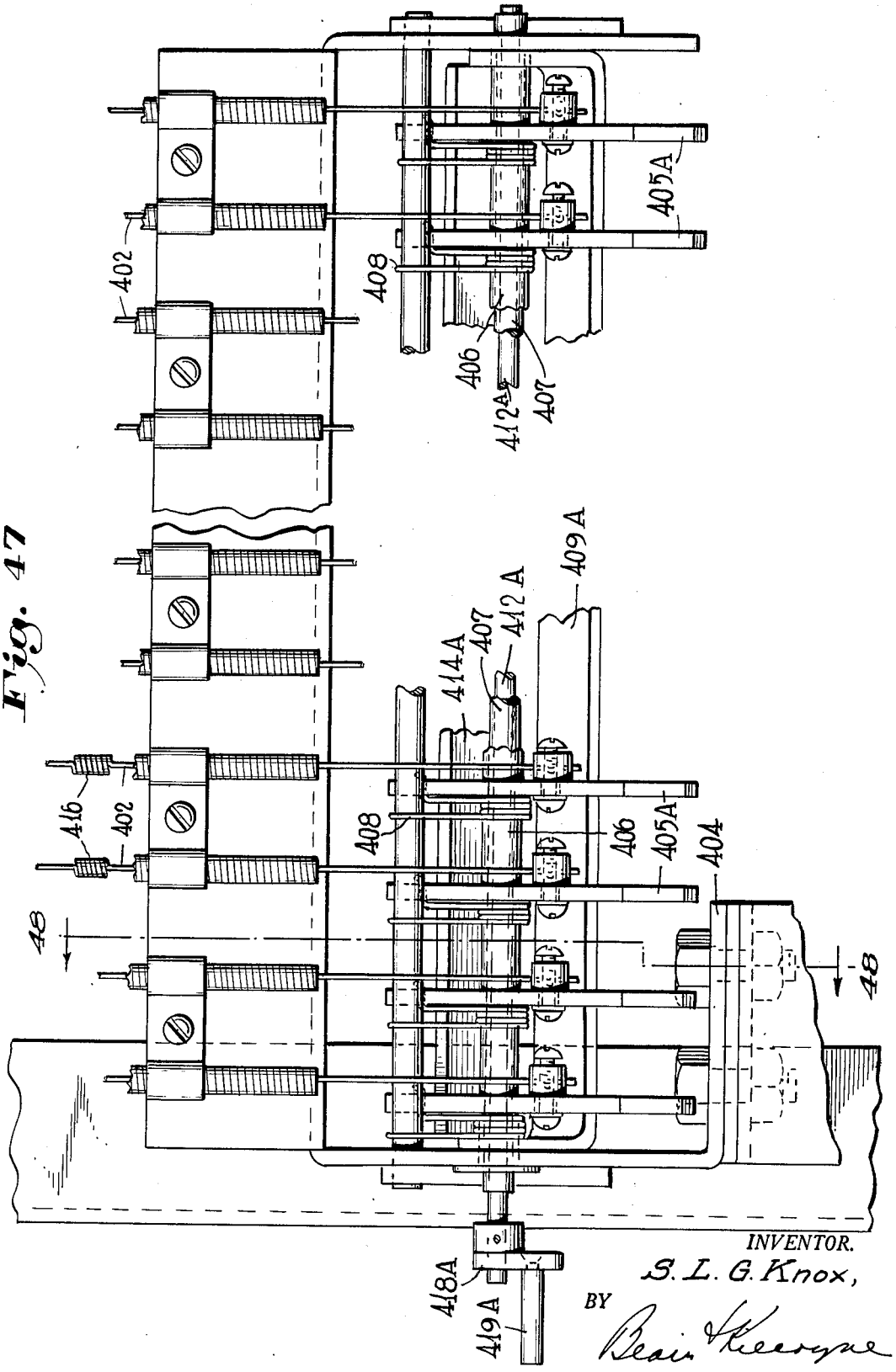

Feb. 9, 1943.    S. L. G. KNOX    2,310,462
VERTICAL CONVEYER SYSTEM
Filed Sept. 20, 1941    28 Sheets-Sheet 24
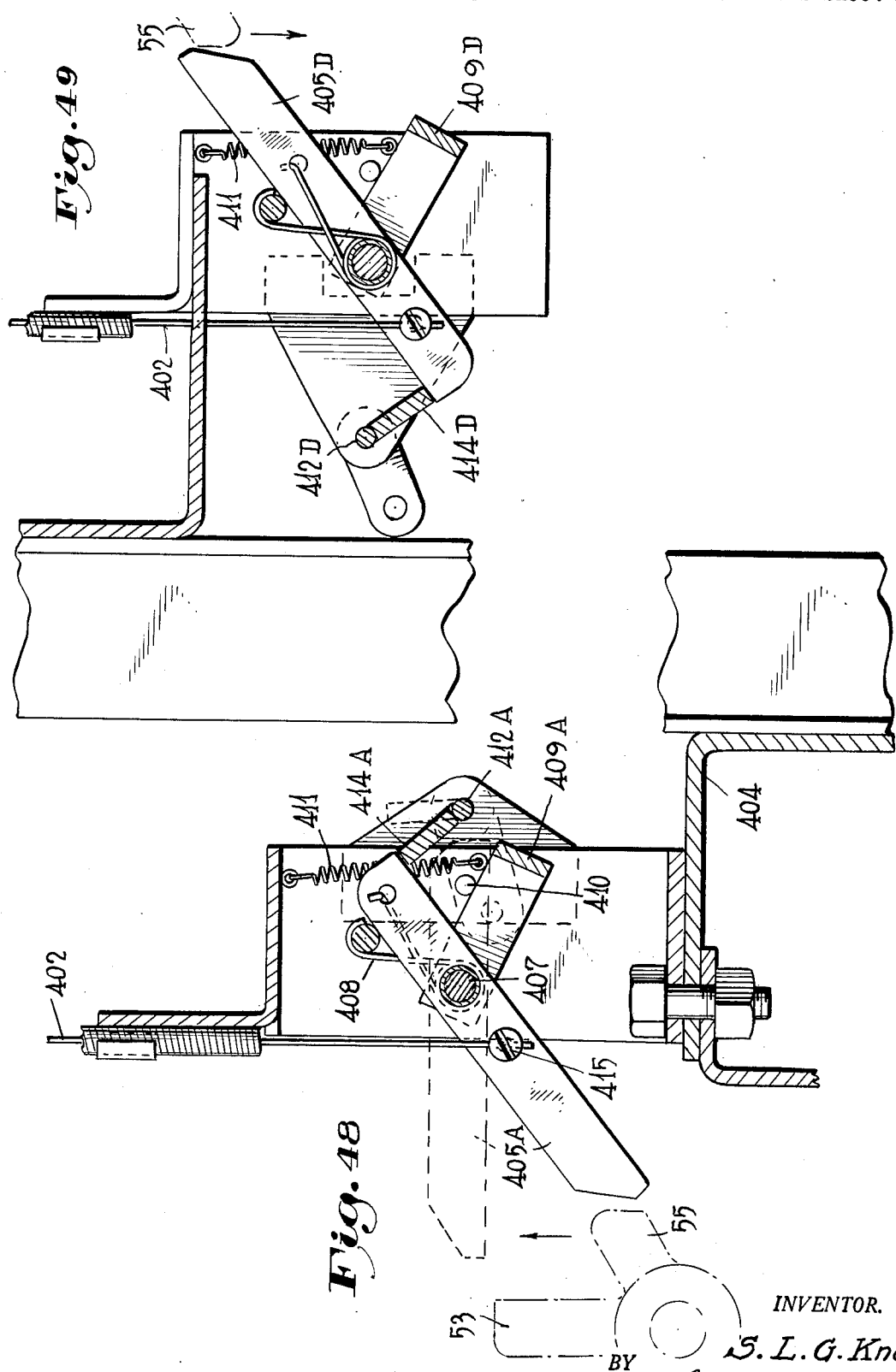
INVENTOR.
S. L. G. Knox,
BY
ATTORNEYS

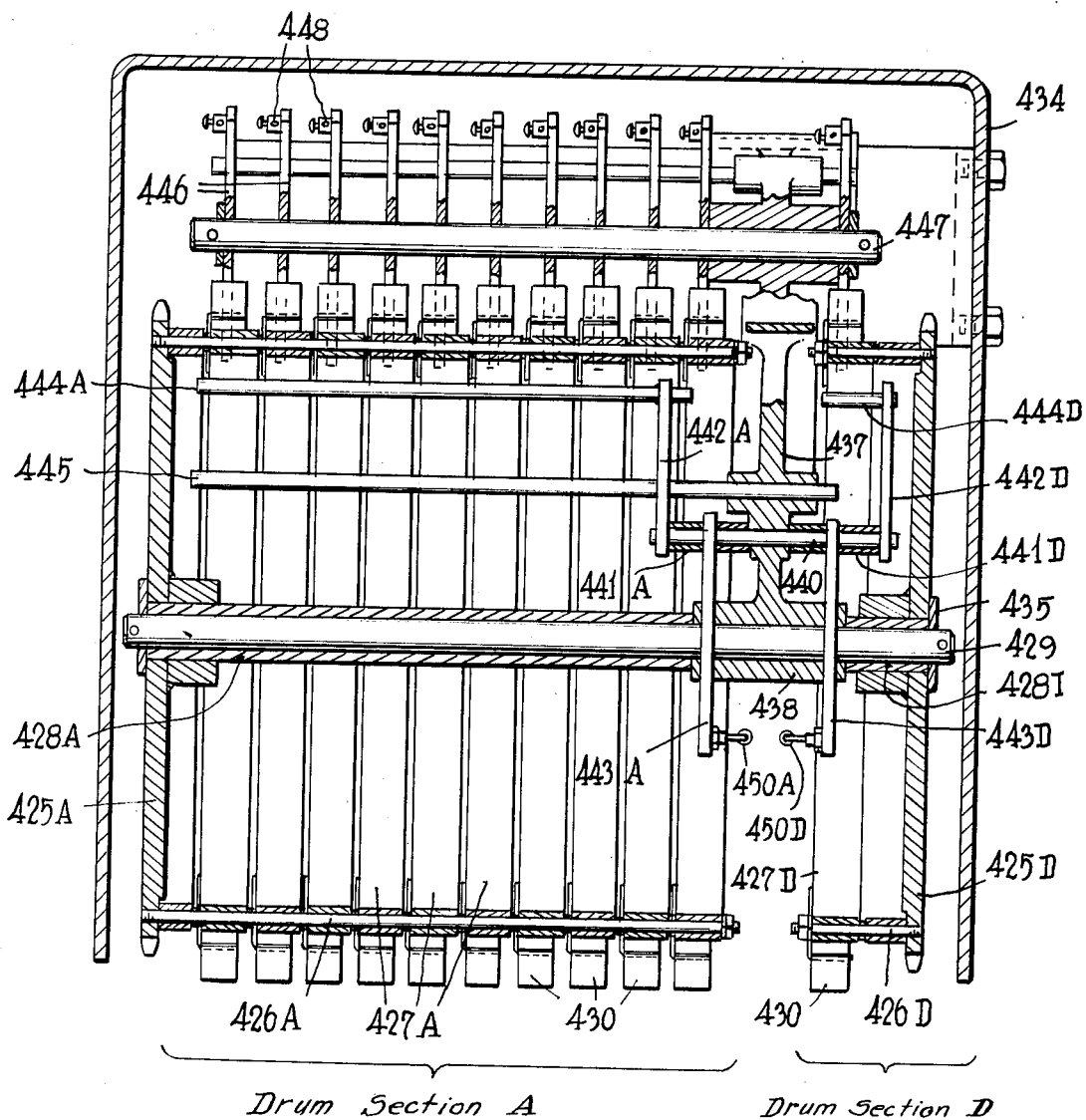

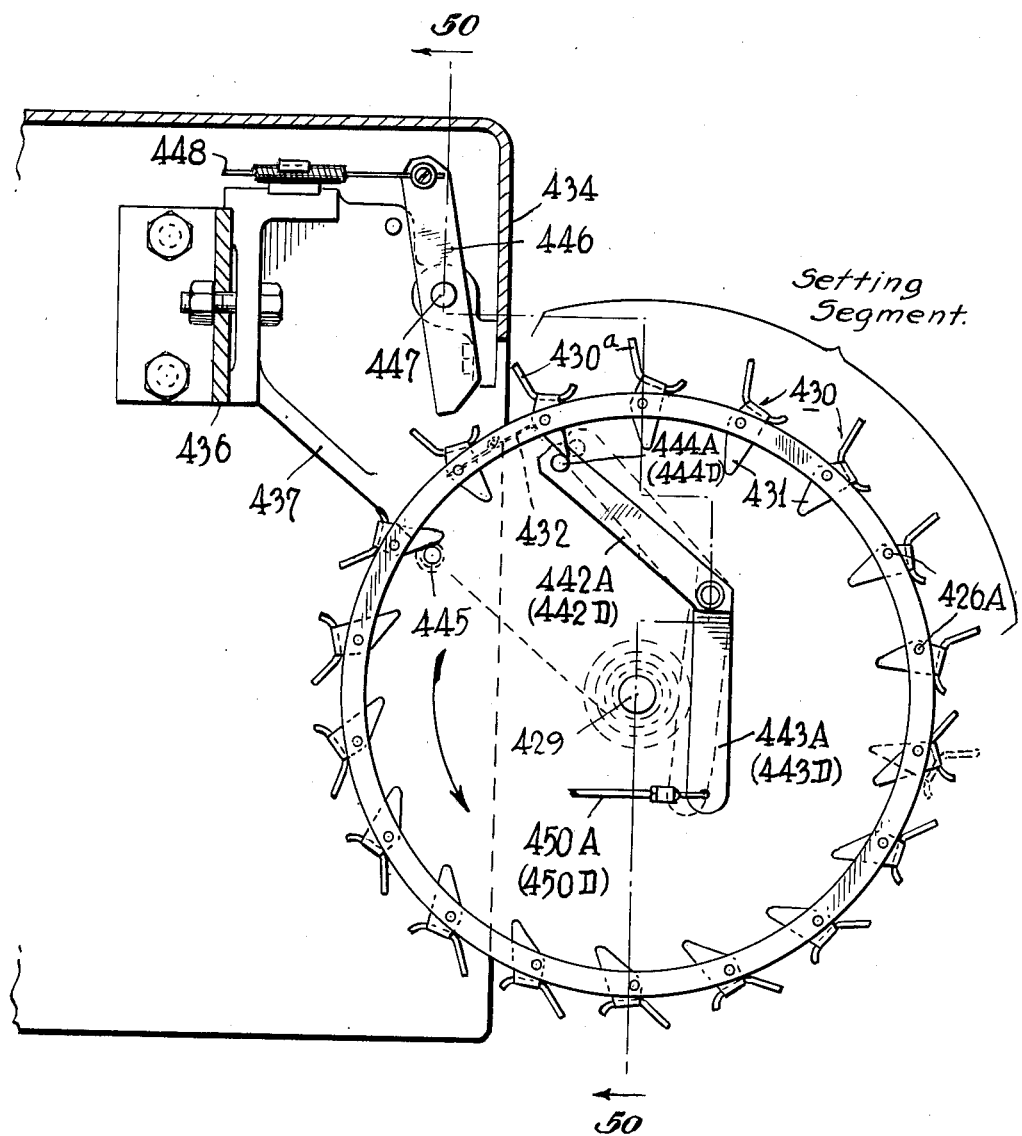

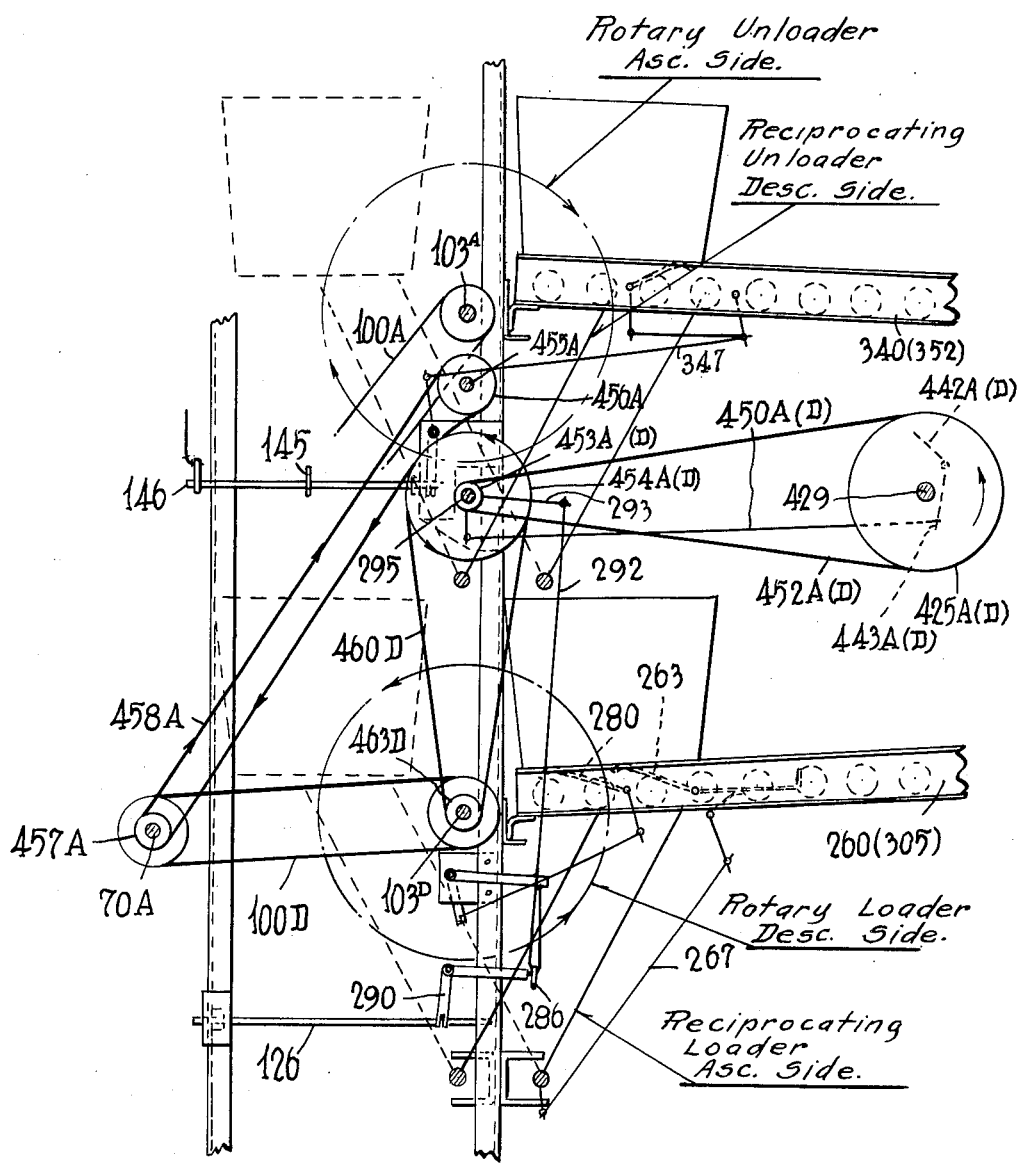

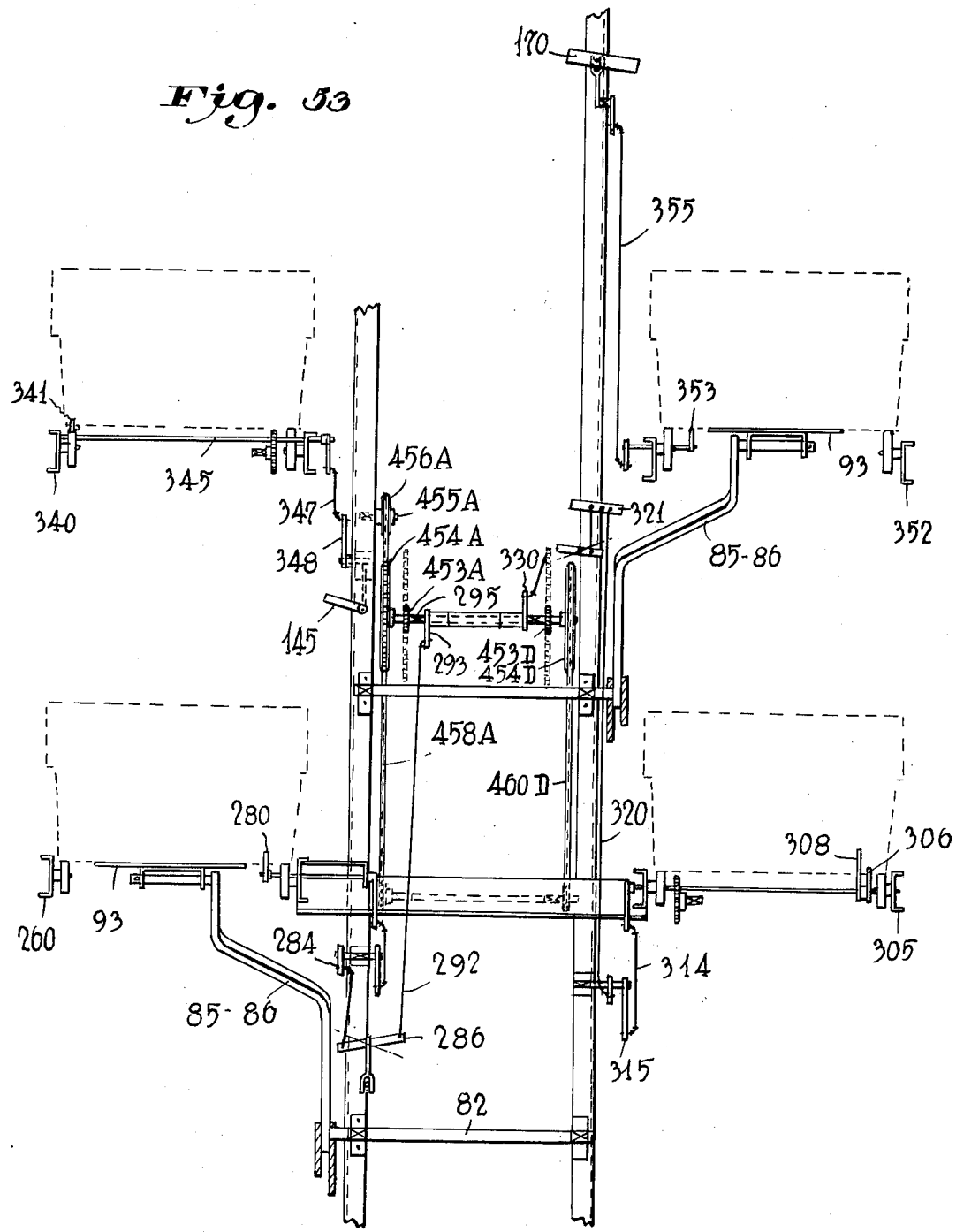

Patented Feb. 9, 1943

2,310,462

UNITED STATES PATENT OFFICE 2,310,462

VERTICAL CONVEYER SYSTEM

Samuel Lippincott Griswold Knox, Englewood, N. J., assignor to Lamson Corporation, Syracuse, N. Y., a corporation of New York Application September 20, 1941, Serial No. 411,734

24 Claims. (Cl. 214—11)

This invention relates to improvements in vertical conveyer systems and more particularly to a selectively controlled vertical conveyer system providing direct service between the several floors of a building served thereby.

A principal object of the invention is to provide a vertical conveyer system of the stated character which is wholly mechanically operated, as distinguished from vertical conveyer systems that are operated in whole or in part, or controlled in whole or in part, by electrical means.

A further object of the invention is to provide a fully automatic vertical conveyer system which incorporates the necessary safety controls and interlocks as to insure the safe dispatch of loads from any one floor and the sure delivery of loads at the selected floors to which the loads are destined.

A further object of the invention is to provide in a system of the stated character a highly simple yet effective drive unit for all station mechanisms of a floor set of stations.

A further object of the invention is to provide improved and fully mechanical selecting means for selecting the floor at which delivery of a load or loads is automatically effected, such selecting means being of a character to effect both the single dispatch of loads, that is to say, a selection of load destination as a preliminary to the dispatch of each ready load, and also the multiple dispatch of loads by providing that a plurality of selections corresponding to the destination of loads of a succession thereof ready for dispatch may be set up, with the system thereafter taking over and rendering the succession of selections effective without further attention by the operator.

Other objects will be in part obvious and in part hereinafter pointed out in connection with the following analysis of the invention, wherein is illustrated one or more embodiments of the invention in detail.

In the drawings—

Figs. 1 and 2 are, respectively, broken away front and side elevations illustrating in diagrammatic fashion a building served by a vertical system in accordance with the present invention.

Fig. 3 is a section taken along line 3—3 of Fig. 1.

Fig. 4 is a section taken along line 4—4 of Fig. 1.

Figure 5:
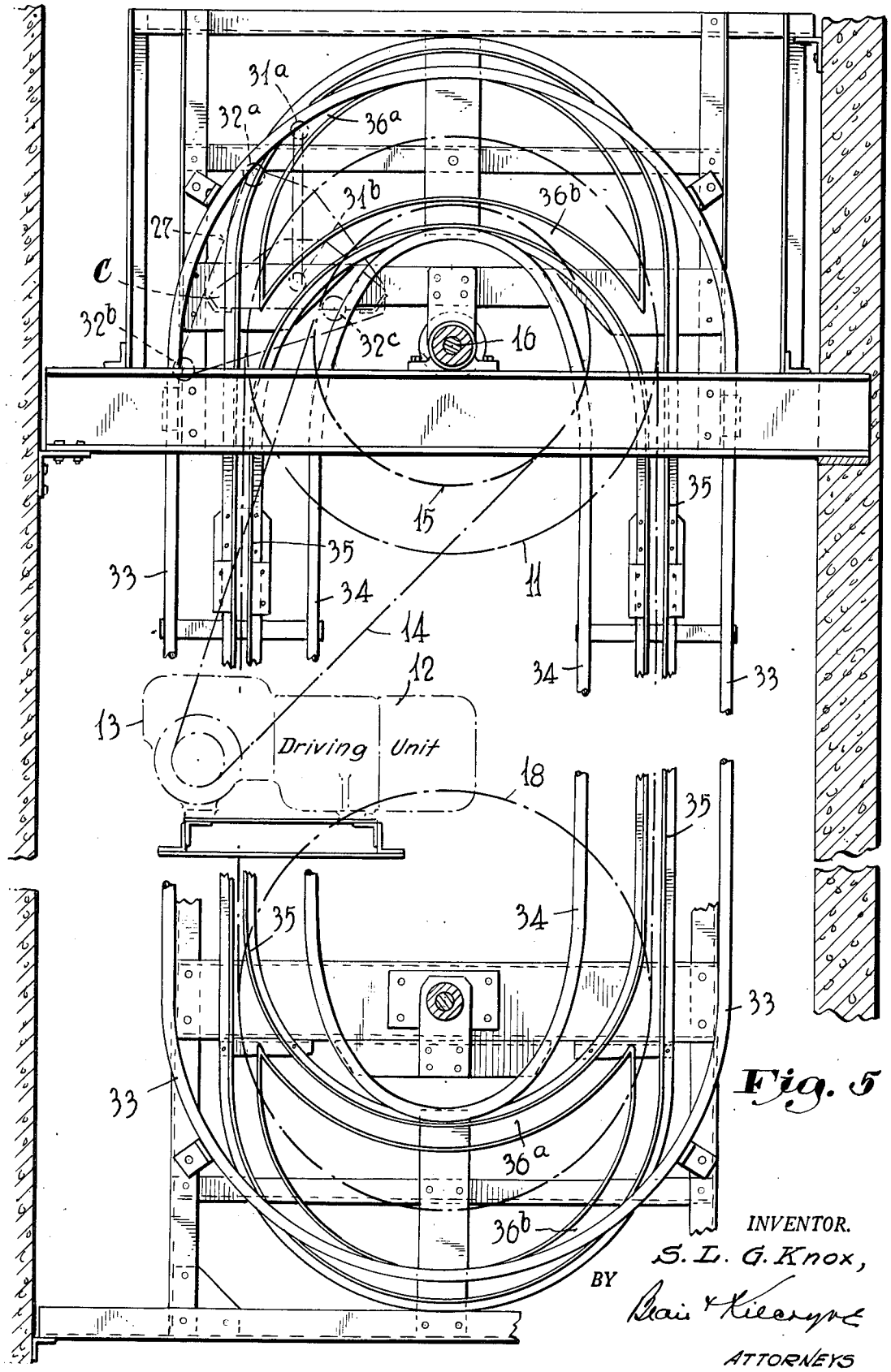

Fig. 5 is a broken away elevation illustrative of the general path of the conveyer chain, its mounting within a supporting framework, the path of travel of the load carriers, and the manner in which the latter are guided during their travel with the chain, the upper half of the view being representative of the drive section and the lower half being representative of the take up section of the conveyer system.

Fig. 6 is a front view of one of the plurality of load carriers employed in the conveyer system of the present invention.

Fig. 7 is a section taken along the line 7—7 of Fig. 6.

Fig. 8 is a broken away detail, looking from the left of Fig. 6, of a car tab assembly carried by each of the load carriers or cars.

Fig. 9 is an end view of the tab assembly illustrated in Fig. 8.

Fig. 10 is a section taken along the line 10—10 of Fig. 8.

Fig. 11 is a section taken along the line 11—11 of Fig. 8.

Fig. 12 is a section taken along the line 12—12 of Fig. 8 and which illustrates one of the car tabs in its set or active position.

Figs. 13A and 13B (combined) is an assembly view looking into the side of a floor set of stations, the view being illustrative of the assembly of parts and the controls for the dispatch and delivery station of a floor set thereof on the ascending side of the system.

Figs. 14A and 14B (combined) is a front elevation of the assembly illustrated in Figs. 13A and 13B.

Figs. 15A and 15B (combined) is an assembly view, similar to Figs. 13A and 13B, looking into the other side of the floor set of stations, and illustrating the assembly of parts and the controls for the dispatch and delivery stations of a floor set thereof on the descending side of the system.

Figs. 16A and 16B (combined) is a rear elevation of the assembly illustrated in Figs. 15A and 15B.

Fig. 17 is a horizontal section taken through a driving unit with which each of the system floor sets of stations is provided.

Figs. 18 and 19 are, respectively, broken away side and front elevations of the reciprocating type station mechanism for dispatch stations on the ascending side, it being understood that by proper reversal these figures are also indicative of the reciprocating type unloading mechanism for delivery stations on the descending side.

Fig. 20 is a part section view illustrating the mounting and constructional details of a rotary type unloading mechanism for delivery stations on the ascending side and by suitable reversal also indicating the rotary type loading mechanism for dispatch stations on the descending side.

Fig. 21 is a top view of the rotary unloading shelf illustrated in Fig. 20.

Figure 22:
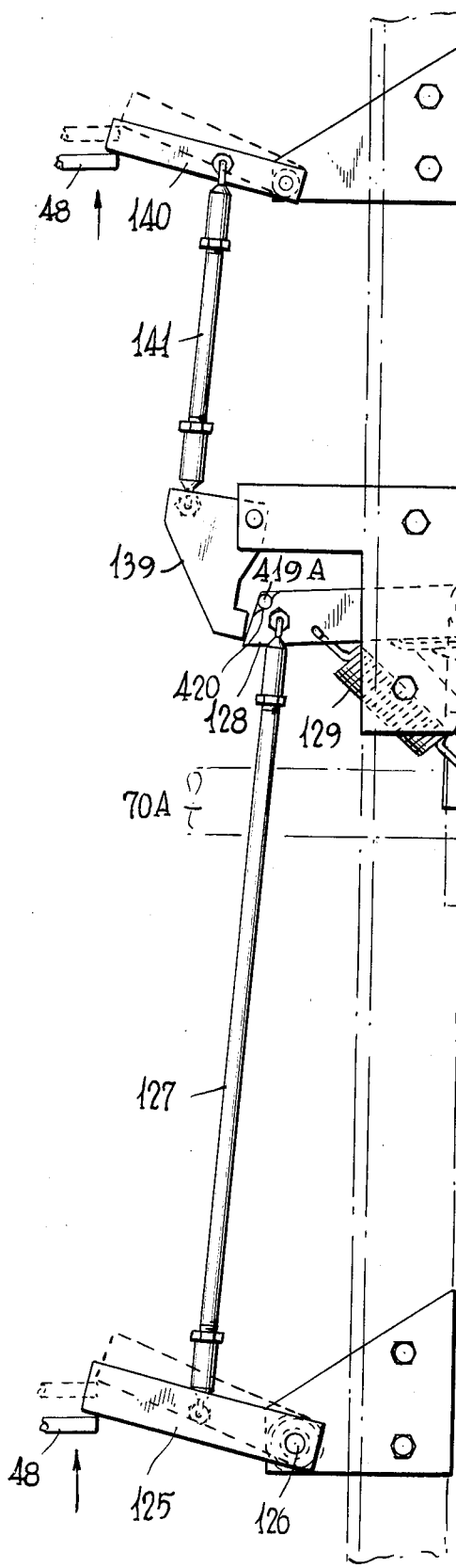
Figure 23:
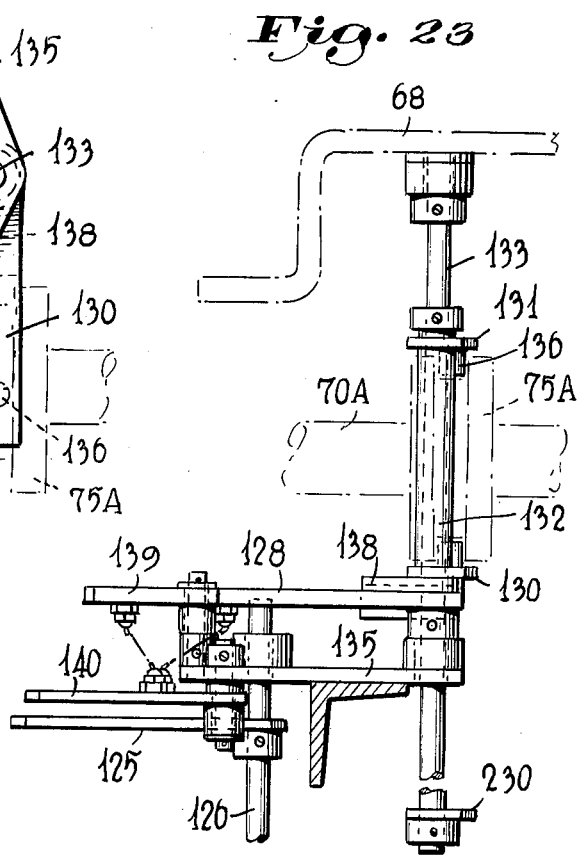
Figure 28B:
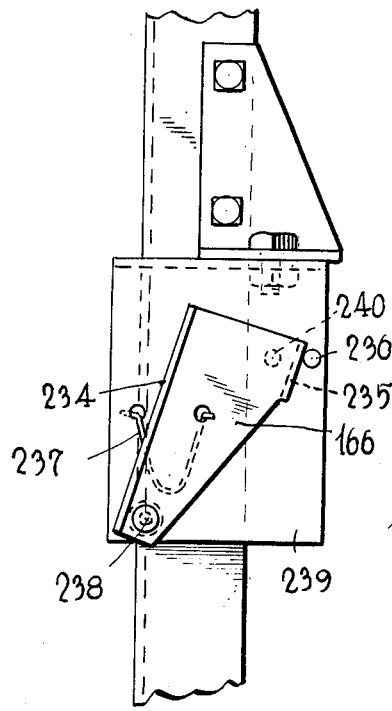
Figure 29B:
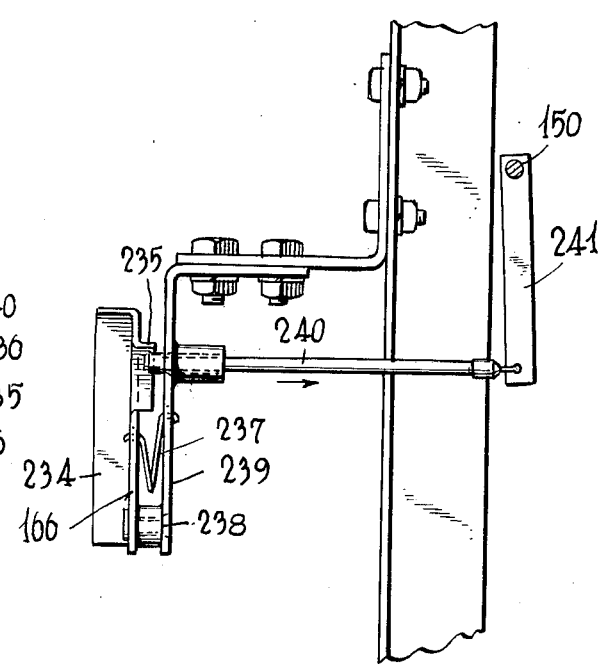
Figure 28A:
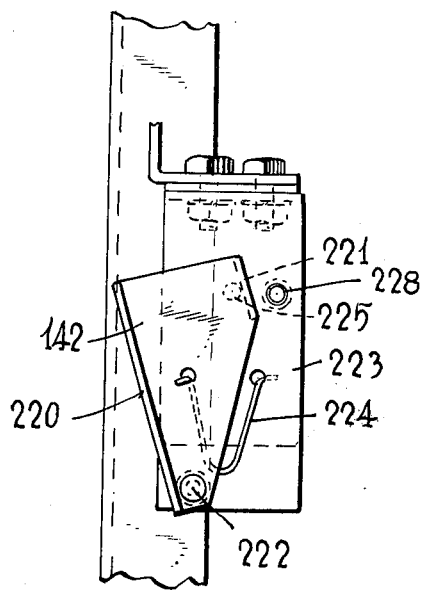
Figure 29A:
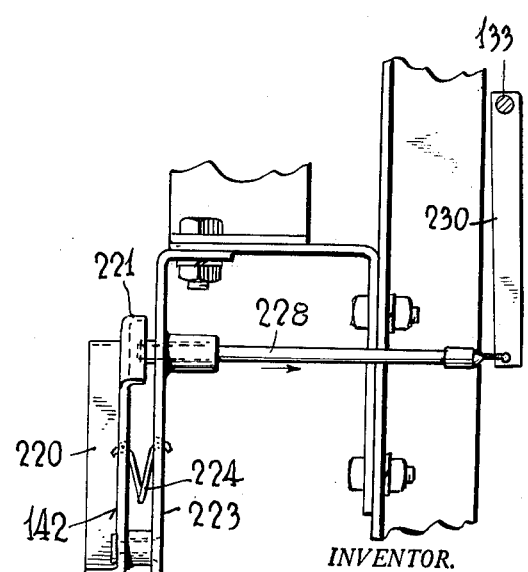

Figs. 22 and 23 are details in elevation and plan of the clutch set and clutch release linkage systems for dispatch stations on the ascending side.

Figs. 24 and 25 are similar views of the clutch set and clutch release linkage system for delivery stations on the ascending side.

Figs. 26 and 27 are similar views for both delivery and dispatch stations on the descending side.

Figs. 28A and 28B, and Figs. 29A and 29B, are, respectively, face and end views of the shift and reset cams of a floor set of stations on the ascending side.

Figs. 30A and 30B, and Figs. 31A and 31B, are, respectively, end and face views of the reset and shift cams for stations on the descending side.

Figs. 32, 33 and 34 are details of the ready load sensing mechanism illustrating the interlocking relation thereof with a dispatch station mechanism on the ascending side.

Figs. 35, 36 and 37 are similar views of the ready load sensing mechanism as associated with dispatch stations on the descending side.

Figs. 38 and 39 are details of the station interlock operated from the load receiving incline of a delivery station on the ascending side.

Figure 40:
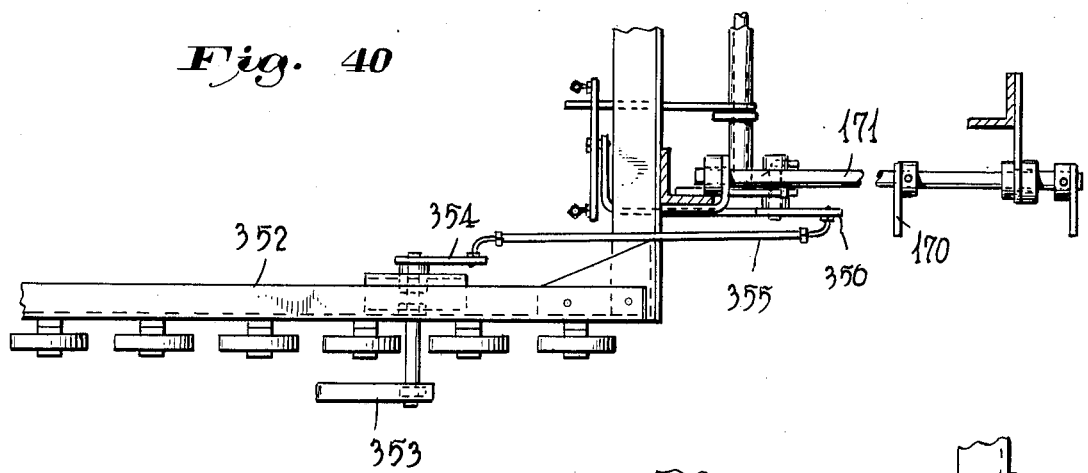
Figure 41:
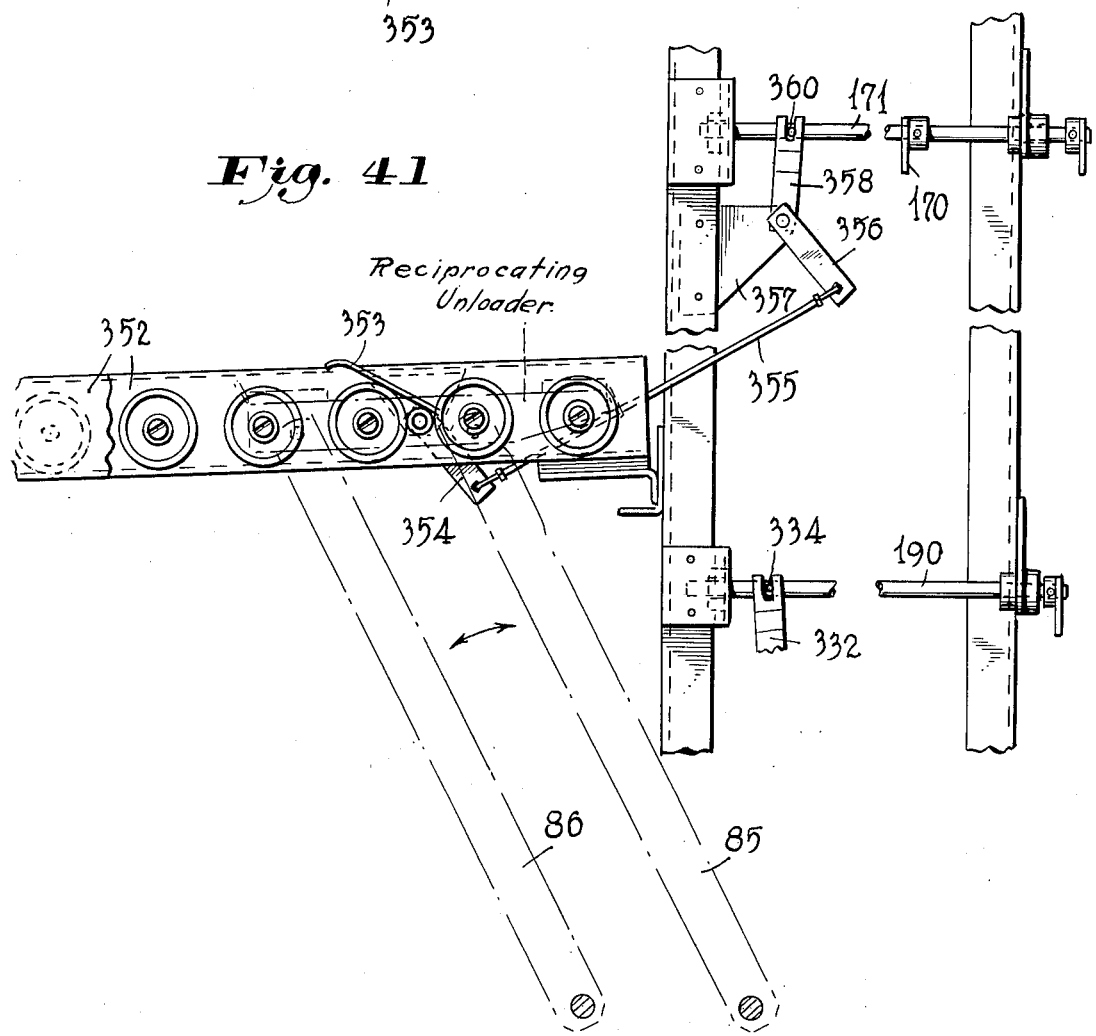

Figs. 40 and 41 are similar views of the interlock operated from the station inclines of a delivery station on the descending side.

Fig. 42 is a front view of the push button selector mechanism employed with each floor set of stations.

Fig. 43 is a section along line 43—43 of Fig. 42.

Fig. 44 is a section along line 44—44 of Fig. 42.

Figure 45:
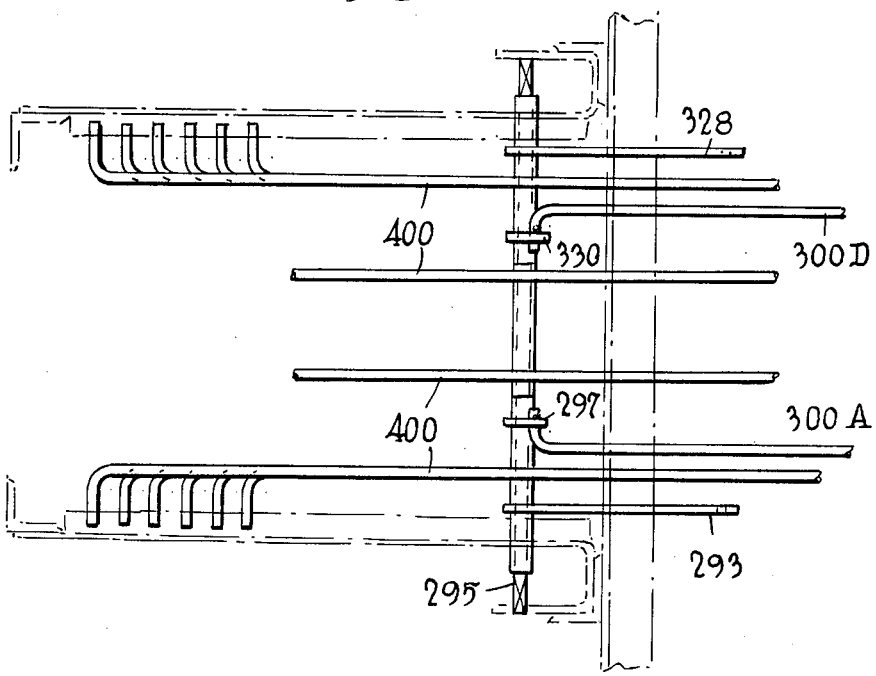
Figure 46:
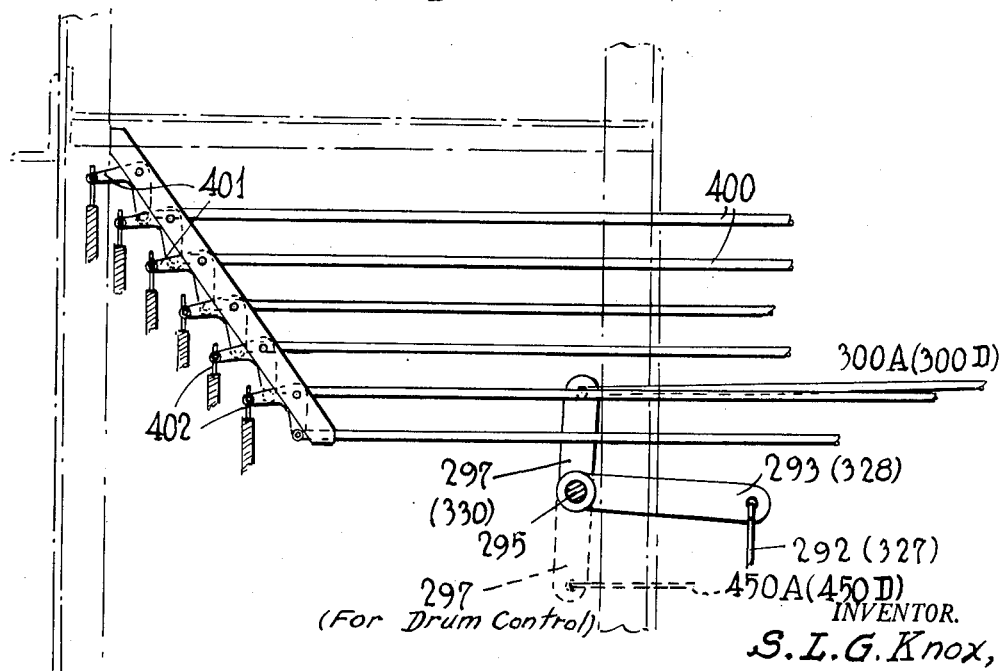

Figs. 45 and 46 are detail views illustrating the connection between the push button and station tab assemblies.

Fig. 47 is a broken away elevation of a station tab assembly.

Fig. 48 is a detail illustrating the station tab mounting for all station tab assemblies on the ascending side.

Fig. 49 is a detail of the station tab mounting for all station tab assemblies on the descending side.

Figs. 50 and 51 are views illustrating a modified form of drum-type selecting mechanism providing for the multiple dispatch of a succession of loads ready for dispatch, Fig. 50 being a transverse section and Fig. 51 being a view looking into the drum and associated parts.

Fig. 52 is a diagrammatic view looking into the side of a floor set of stations, which illustrates the relationship of station mechanism to station inclines as well as thé drive for the drum-type selecting mechanism.

Fig. 53 is a similar view looking into the front of a floor set of stations.

Referring to the drawings, wherein like reference characters designate like parts throughout the several views, Figs. 1 and 2 represent typical floors of a building having twelve floors (including the ground floor), all of which are served by a vertical conveyer system in accordance with the present invention. The number of floors will of course depend on the particular building and its service requirements, the twelve story building referred to and partially illustrated being chosen only for the purpose of description.

CONVEYER—GENERAL

The vertical conveyer as generally illustrated is of the type employing an endless uni-strand chain 10 having a vertically arranged ascending run A, and a vertically arranged descending run D. The chain at its upper end travels over and is driven by a driving sprocket 11, the latter being driven from a driving unit illustrated in Fig. 5 including an electric motor 12, reduction gearing 13, and a drive chain 14 driving a chain sprocket 15 which in turn drives the shaft 16 to which the driving sprocket 11 is keyed. The driving unit is organized in conventional manner with the upper drive section of the framework as shown in Fig. 5, the lower end of the conveyer chain 10 traveling around a sprocket 18 carried by the lower take-up section of the framework, the details of which are not here described as it forms per se no part of the present invention.

The entire conveyer is supported by and operates within a frame structure of approved construction, the latter extending vertically within a well or casing provided in the building serviced thereby. The drive section, as diagrammatically indicated in Figs. 1 and 2, may be positioned in an enclosure extending above the roof of the building, with the driving unit therefor being contained in a sub-enclosure which is accessible from the roof. It will be understood, however, that the referred to arrangement is suggestive only. With respect to the take-up section, the same is preferably located so as to be accessible from either the ground floor level or from the sub-basement. As shown, each floor of the building adjacent the conveyer well is provided with a loading enclosure which is so designated, access to which is provided through an opening communicating with the particular floor. The relatively forward wall defining the conveyer well is provided at each intermediate floor with sets of four service openings O, of which two openings, one above the other, register with the ascending run of the chain and the other two openings, arranged one above the other, register with the descending run of the chain.

To provide direct service between the floors of the building, the present system provides both a delivery and a dispatch station for each floor on the ascending side of the system, and also a delivery and dispatch station for each floor on the descending side of the system. Thus, each floor, excepting the top and bottom floors, as will be discussed hereinafter, is served by four stations, with the system giving four-way service on each floor through the floor station arrangement generally illustrated in Figs. 1 and 2. As shown, the four stations for each floor are organized into a compact floor set, with the two delivery stations of a floor set being disposed above the two dispatch stations of the set. The location of the dispatch stations of a set below the delivery stations thereof makes for convenience in loading levels inasmuch as loads ready for dispatch are not required to be raised to high levels as in the case of a dispatch station of a floor set being arranged at a higher level than the delivery station of that set. However, the invention is not limited to the aforesaid arrangement, but on the other hand where maximum capacity is desired, the delivery station of a floor set for the ascending side may be disposed below the dispatch station on the same side of the system so that following unloading of a carrier the same may be immediately reloaded at the dispatch station of the floor set located immediately above.

Preferably, each of the intermediate floors, such as the first through the tenth floors of the building, are equipped with the four-way floor set as described, whereas the ground floor and the eleventh or top floor do not require this arrangement. For these extreme points of service, one dispatch station and one delivery station, preferably located on the descending side of the system, will suffice, because an operator on the top and ground floors would not ordinarily dispatch a load to a delivery station located on the same floor. If desired, the delivery stations at the top and ground floors may be fixed so as to effect the unloading of all loaded cars reaching these extreme floors.

*Load carriers (cars)*

The chain 10 has pivotally connected thereto at suitable intervals a plurality of load carriers C hereinafter designated cars, the construction and mounting of which are illustrated in Figs. 6 and 7. Each car proper consists of a vertical leg 20 having forwardly extending side arms 21, 22, which are spaced laterally to support loads from the bottom and along the side corners thereof. Each side arm has an upwardly extending side piece 23, which functions to preclude lateral displacement of a load supported on the car platform as provided by the side arms 21, 22, and with an upwardly directed lug 24 against which the front corners of the load may engage. Fixedly secured to the upper end of the vertical leg 20 of the car is a spindle 25, the latter extending rearwardly of the car and being pivotally connected to the conveyer chain 10. The spindle 25 extends through suitable bearings in a sleeve 26 carried by the car back plate 27. Secured to the rear end of the spindle 25 is a vertically arranged equalizing bracket 30 carrying at the ends thereof the rollers 31a and 31b.

The back plate 27 carries three track rollers of which 32a, 32b are designated outer rollers, and the intermediate roller 32c is referred to as the inner roller. By reference to Fig. 5 it is apparent that the back plate rollers 32a, 32b run on an outer endless guide rail 33, and the inner roller 32c runs on an inner endless guide rail 34. The guide rails 33 and 34 extending throughout the vertical height of the conveyer framework and are symmetrically disposed with reference to the chain 10, which latter is guided in a channel (not shown). At their upper and lower ends, the guide rails 33 and 34 are suitably curved so that the car back plate 27, in making the turns, is caused to turn relatively up-side-down or to turn 180° on the axis of the guide roller 32c. However, the car proper, due to the mounting of spindle 25 within the bearing sleeve 26, may turn relatively of its back plate and is maintained horizontal in making the turns by the travel of equalizer rollers 31a and 31b in the curved tracks 36a, 36b, which are arranged at both the upper and lower ends of the station framework and in a plane to the rear of the plane of the conveyer chain 10. To assist in maintaining the car horizontal in making the turns, the car side arms may each be provided with a projecting roller 38, which rollers are adapted to engage curved cam guides (not shown) arranged to guide the car around the turns.

With the system so far described, it will be understood that the plurality of cars C are propelled by the chain along an endless path of travel and are maintained horizontal in making the upper and lower turns, although the car back plates, to which the cars proper are pivotally related, are caused to turn on themselves in making both the upper and lower turns.

*Car carried tab assembly*

Each car carries an assembly of tabs which are normally maintained in an inactive position but which are adapted to be individually set to active position in accordance with the operator's selection, as will hereafter appear.

Referring to Figs. 8 to 12, inclusive, wherein a car carried tab assembly is illustrated, the car back plate 27 carries along one side thereof two forwardly extending rods 40, 41, the latter being spaced by and fixedly secured at one end to the back plate and spaced at their forward end by an end piece 42. As shown, rod 40 is of circular section and rod 41 is of hexagon shape. Slidably mounted on rod 40 is a sleeve 43, the latter carrying at one end a stop collar 44 and at its other end an actuating collar 45. The rod 40 carries at its relatively inner end a fixed collar 46, and the spacing between fixed collar 46 and end piece 42 is somewhat greater than the length of sleeve 43 whereby the latter with its stop collar 44 and its actuating collar 45 is permitted axial movement on rod 40.

The actuating collar 45 has a bifurcation 47 formed on its bottom, the same fitting over and being adapted to slide on the two top faces of the hexagon-shaped rod 41. The actuating collar 45 also carries a laterally extending shift pin 48 (see Fig. 10), the latter projecting into sleeve 43 to prevent turning of the latter. The shift pin 48 is arranged to be lockably engaged by companion leaf springs 50 which are carried by the fixed collar 46.

Carried by the sleeve 43 are a plurality of individually mounted tab units, each comprising a mounting bushing 52, from which extends a tab 53, a lug 54 angularly related to but disposed in the general plane of the tab, and a dog 55 which is angularly related to the tab and is further spaced therefrom axially. The tab units, unless held in their active position, are each maintained in their inactive position (see Fig. 11 for ascending side) by a torsion spring 56, one end of which is secured to the dog 55, and the other end to a tie bar 57 which extends between actuating collar 45 and stop collar 44. With the tab assembly in its "in" position (Fig. 11), the upper nose portion of each tab dog 55 lines up with and is adapted to be engaged by a set station tab corresponding thereto as will be described, and each tab lug 54 lines up with its own holding spring 58 as carried by the hex rod 41. When the tab dog 55 of the tab unit is engaged by a station tab as aforesaid, the tab unit is rotated clockwise, whereupon its lug 54 rides under the free end of its holding spring 58. Thereafter, when disengagement of dog 55 and the set station tab is effected, the turned tab unit tends to return to its initial position, but in so doing its lug 54 is engaged by the free end of its holding spring 58 and the tab unit is thereby held in its active or set position, as shown in Fig. 12. In this active position the tab 53 of the unit extends horizontally and is adapted to engage an aligned station device of one of the delivery stations, as will be described. Return of any active tab to its inactive position is effected by axial movement of the tab assembly to its "out" position, whereupon the lug 54 of the active unit moves to the side of its related holding spring 58, and the tab unit returns to its inactive position under the urge of its spring 56.

With the construction so far described, it will be seen that the tab assembly including parts 43, 44, 45, 47, 48, and also the tab units carried by the sleeve 43, is movable as a unit between the fixed collar 46 and the end piece 42 from its normal "out" or inactive position, in which stop collar 44 engages end piece 42, to its "in" or active position, illustrated in Fig. 8, in which actuating collar 45 engages fixed collar 46. When actuated to the latter position, springs 50 lock about shift pin 48, and thereby hold the assembly in its active position until the latter is positively returned to its normal inactive position. It will also be apparent that the tab units of an assembly thereof can be set to active position only when the tab assembly has been moved as a unit to its "in" position, due to the fact that a lug 54 of any one of the tab units can be held by its spring 58 only when such parts are lined up as indicated in Figs. 8 and 12. As the system under description is designed to serve all floors of a twelve story building, each car tab assembly will provide twelve tab units, each unit being individual to a particular floor and being operative to actuate only the station device of the particular floor.

Drive unit

According to the present invention, the station mechanisms of all four stations of a floor set thereof are driven from the conveyer chain, preferably through the one differential gear unit as illustrated in Fig. 17. As there diagrammatically illustrated, a large diameter sprocket 60 meshes with chain 10 and is accordingly driven by the latter. The sprocket 60 is carried by a shaft 61 in turn carrying sprocket 62 which is connected by a suitable driving chain 63 with a sprocket 64, the latter being thus continuously driven from the chain 10. Sprocket 64 is fixed to a bevel gear 65 carrying a bearing sleeve turnable on a fixed spindle 66, the latter being pinned at one end to a hub 67 secured to frame 68 and supported at its other end in a bearing casting 69 supported from frame 68. The casting 69 carries bearing sleeves for the divided shafts 70A and 70D, the outer ends of which are supported in bearings 71 and 72.

Bevel gear 65 meshes with bevel gear 72A to which is fixed a sprocket 73A, both being carried by a sleeve 74A turning relative to shaft 70A, the sleeve also carrying the shiftable male element 75A of a clutch. The female element 76A of the clutch is keyed to shaft 70A whereby upon engagement of clutch parts 75A, 76A, shaft 70A is driven from sprocket 64. The shaft 70A carries at its end a crank 77A.

Bevel gear 65 also meshes with bevel gear 72D carrying sprocket 73D, both the latter being keyed to sleeve 74D turning relatively of shaft 70D. The sleeve 74D carries the shiftable male element 75D of a clutch, the female element 76D thereof being keyed to shaft 70D. Upon engagement of clutch elements 75D, 76D, shaft 70D is driven from sprocket 64. Shaft 70D carries at its end a crank 77D.

By the aforesaid arrangement, sprockets 73A, 73D are continuously driven from sprocket 64, and shafts 70A, 70D are driven from sprocket 64 upon engagement of clutch parts 75A, 76A and 75D, 76D, respectively.

Dispatch station mechanism (ascending side)

According to the present invention, shaft 70A of a drive unit drives the station mechanism of the associated dispatch station on the ascending side of the system, such mechanism for all dispatch stations on the ascending side being of the reciprocating feeder type illustrated in Figs. 18 and 19. As there shown, and by reference also to Fig. 13B, crank 77A is pivotally connected to one end of a bar 80, the other end being pivotally connected to crank arm 81 fixedly secured to rocker shaft 82 mounted in spaced bearings 83, 84 carried by the station framework. Rocker shaft 82 carries an upwardly and relatively sidewardly directed rocker arm 85. Cooperating with rocker arm 85 is a parallel rocker arm 86 fixed at its lower end to a rocker shaft 87 turning in bearings 88 corresponding to the bearings 83, 84. The rocker arms 85, 86 carry at their upper ends spaced shelf-supporting spindles 90, 91, each extending through bearing sleeves 92 carried by a shelf 93. Extending crosswise of the shelf are front and rear cross pieces 94, 95 suitably covered by pads 96 on which the loads are adapted to rest. Preferably, the shelf at its rearward end is provided with an upwardly directed flange 97 against which the rear corner of the load may engage as it is picked from the delivery station incline to be described.

In its normal or retracted position the shelf is disposed to the right of its intermediate or full line position indicated in Fig. 18 and takes up a position between the ends of the channels 260 forming the station incline (see Figs. 33, 52 and 53) and at a level somewhat below the bottom of a ready or endmost load in position for dispatch on the incline. Engagement of clutch elements 74A, 75A results in turning movement of shaft 70A, and hence of crank 77A, the latter actuating the shelf throughout an operating cycle from its normal or retracted position into its load transfer position in which it intermembers with the side arms 21, 22 of an ascending car and thence back to its retracted position, as aforesaid.

Delivery station mechanism (ascending side)

Sprocket 73A of the driving unit provides the drive for the delivery station mechanism (ascending side) of the floor set, being connected by a chain 100A (Figs. 13A and 52) with a sprocket 101 fixed to bearing sleeve 102 turning on shaft 103 (Fig. 20), the latter being supported at one end in a bearing 104 carried by a bracket 105 extending from the station framework. An end collar 106 restrains shaft 103 against movement to the left. Slidably mounted on sleeve 102 for turning therewith is a male clutch element 108 adapted for engagement with a female clutch element 109 keyed to shaft 103. Hence, upon engagement of clutch elements 108, 109, shaft 103 is driven through sprocket 101 and chain 100A from sprocket 73A of the driving unit.

The station mechanism for delivery stations on the ascending side of the system is of the rotary type and employs a rotating unloading arm 112 fixed to one end of shaft 103 for rotation by the latter, the arm further serving to restrain shaft 103 against axial movement to the right. Arm 112 at its free end carries a shelf spindle 113 extending into a sleeve 114 carried by a load supporting shelf 115, the latter being provided with front and rear cross pieces 116 suitably covered by pads of leather or the like on which the loads engage.

The end of shaft 103 adjacent arm 112 turns in a bearing 118 and fixed to said bearing is a sprocket 119 connected by chain 120 to sprocket 121 carried by spindle 113. An idler 122 disposed between sprockets 119 and 121 is provided to take up any slack occurring in chain 120.

As the shaft 103 is rotated clockwise (Figs. 13A and 20) arm 112 revolves through a 360° cycle of movement in an arcuate path from a normal or retracted position in which it is disposed between the channels 305 of an unloading incline to be described to a load transfer position in which the arm intermembers with the side arms 21, 22 of an ascending car, and thence back to its retracted position. Due to clockwise rotation of the arm, the latter moves in under the ascending car and thence upwardly between the car arms and back to its normal or "at rest" position. The angular speed of the arm is such that its shelf 115 travels at a faster rate than the ascending cars, so that the shelf in its upward movement relative to the car clears the latter in moving into and out of the path of car travel.

As arm 112 is given its rotary or orbital movement, the spindle 113 is maintained in a relatively fixed position due to chain 120 meshing with sprocket 121. Accordingly, the shelf 115 is at all times maintained horizontal due to the relative movement taking place between arm 112 and spindle 113 through sprocket 121.

*Delivery and dispatch station mechanisms (descending side)*

As all stations on the descending side of the system are adjacent the descending run of the chain 10, each delivery station on that side employs a reciprocating unloader which is substantially identical with the reciprocating loader employed with dispatch stations on the ascending side of the system. Accordingly, the reciprocating unloader will not be here described, although reference is made to Fig. 53 to show the manner in which the reciprocating unloader is reversed with respect to the reciprocating loader to take care of the righthand condition obtaining in the case of delivery of loads on the descending side of the system.

Similarly, each dispatch station on the descending side of the system employs a rotary arm type of loading mechanism driven by a shaft 103D shown in Fig. 52 (in which figure shaft 103A corresponds to shaft 103 of Fig. 18). Such loading mechanism is substantially the same as the rotary unloader employed with delivery stations on the ascending side, with the exception that in the case of the rotary loader the arm moves relatively counter-clockwise and in so doing lowers a load carried on the shelf onto a car passing the station.

*Car control of drive unit clutches*

According to the invention, means are provided whereby clutch elements 75A, 76A are automatically engaged upon an approaching car coming into the zone of any one of the dispatch stations on the ascending side of the system, with its tab assembly in normal "out" position to which it was actuated in passing the delivery station at which the car last effected delivery of a load. Hence, the positioning of the car tab assembly in "out" position functions as a load "telltale" and insures that only empty cars approaching a dispatch station can operate the station mechanism thereof to its load transfer position with reference to the car.

To this end the shift pin 48 of the tab assembly of an approaching empty car is adapted for engagement with a projecting clutch set lever 125 (see Figs. 13B, 22 and 23) carried by a spindle 126 supported both for turning and axial movement in brackets secured to the frame uprights. It will be assumed that spindle 126 is locked in its active or leftmost position due to operation of the interlock to be described and which responds to the presence of a load on the station incline ready for dispatch and also in consequence of the operator's having made a selection of the delivery station to which the ready load is destined. In the active position of spindle 126 the clutch set lever 125 is lined up with the shift pin 48 of the approaching car and when engaged thereby is given limited clockwise movement, as indicated in Fig. 22. This movement is transmitted by rod 127 to finger 128 carried by spindle 133, the finger being resiliently connected by a spring 129 with one arm 130 of a clutch shifter provided on said arm and a companion arm 131 carried by a sleeve 132. Said sleeve is mounted for turning movement on the spindle 133 which is located above and relatively inwardly of the spindle 126. Spindle 133 is shown to be supported at one end in a bearing carried by housing 68 of the drive unit, and at its other end in bracket 135 carried by the station framework. Each of the shifter arms 130, 131 carries a boss 136 engaging in a suitable groove 137 provided in the shiftable clutch element 75A (Fig. 17). Operatively arranged between arm 130 of the clutch shifter and the under face of finger 128 is a spring clip 138 functioning to prevent breakage in case of jamming of the parts but being sufficiently strong as to permit the transmission of finger movement to the clutch shifter.

When finger 128 is raised, it is latched in its relatively raised position by a swingable latch 139 carried by bracket 135, the latching end thereof being adapted to engage under the nose of finger 128.

Latch 139 is released upon shift pin 48 of the car tab assembly engaging clutch release lever 140, such engagement resulting in clockwise movement of the lever, which is transmitted to latch 139 through rod 141. Upon the release lever being so engaged, finger 128 is unlatched, whereupon the clutch set lever returns to its initial position under the influence of spring 124 associated therewith. During such return movement the shifter disengages the clutch elements and the drive to the station mechanism is interrupted.

It will be understood that the positioning of clutch set lever 125 and clutch release lever 140 and the spacing therebetween is such as to effect engagement of the clutch only for the interval required to actuate the reciprocating station mechanism throughout its full cycle of movement, that is to say, from its retracted position to its load transfer position and thence back to its retracted position. It is also noted, referring to Fig. 23, that clutch release lever 140 is offset relatively to the rear of clutch set lever 125. Accordingly, the tab assembly of the approaching empty car must be shifted from its "out" to its "in" position in which its shift pin 48 lines up with lever 140 prior to the pin ascending to the level of the latter. This is accomplished by a shift cam 142 to be described, which in actuating the tab assembly to its "in position" conditions the tab units thereof so that one tab can be set to active position in accordance with the operator's selection while the car is passing through the zone of the particular dispatch station.

With delivery being effected above dispatch on the ascending side of the system in accordance with the present proposal, and with the delivery mechanism being constituted by a rotary unloader, such mechanism according to the invention is actuated upon a car bearing a load destined thereto moving into the zone of the selected delivery station. On the assumption that an approaching car bears a load destined to the delivery station illustrated in part in Fig. 13A, as determined by the setting of a tab of the car assembly thereof in correspondence with the station device of that delivery station, and that the particular delivery station can receive the load, the set car tab will line up with and thereupon actuate a delivery station device in the nature of a station lever or finger 145 fixedly secured to a spindle 146 supported for rotary and axial movement in suitable bearings on the station framework (the spindle is shown as locked in its rightmost position). At its relatively rearward end (see Figs. 24 and 25), the spindle carries an arm 147 which is connected by rod 148 to a shifter operating finger 149, the latter being carried at the end of a spindle 150 which is mounted for turning movement in suitable bearings and extends relatively forwardly and carries adjacent its forward end an arm 151 which is connected by spring 152 with one arm 153 of a shifter assembly. The said arm and its companion shifter arm 154 is carried by a sleeve 155 turnable on spindle 150. The arms 153, 154 each carry a boss 156, the bosses engaging in a circular groove 157 formed in the movable element 108 of the clutch illustrated in Fig. 20. Between arm 151 and shifter arm 153 is disposed a spring clip 158, said clip being sufficiently resilient as to give under jamming pressure but being sufficiently strong as to transmit turning movement of arm 151 to the shifter.

It will be understood that when station finger 145 is engaged by a set car tab, the finger is turned clockwise, and the shifter operating finger 149 is raised. The latter finger is adapted to be latched in its raised position by a latch 160 carried by a suitable frame bracket 161. In its latched position finger 149 maintains clutch elements 108, 109 engaged and, in consequence, the rotary unloading arm 112 is given a 360° rotation from its retracted position into the path of car travel and then back to its retracted position.

Disengagement of the clutch 108, 109 is accomplished by the car ascending to a position in which the shift pin 48 of its tab assembly engages clutch release lever 162 carried by fixed bracket 163 and connected to the latch 160 by a connecting rod 164.

It will be understood that the positioning of the station lever 145 and the clutch release finger 162 and the vertical spacing therebetween is such as to maintain the clutch engaged only for the interval required to actuate the unloading arm 112 throughout its full cycle of movement.

By reference to Figs. 13A and 25, it will be seen that clutch reset finger 162 is offset forwardly from the vertical line of travel of shift pin 48 of the tab assembly when the latter is in its "in" position. This offsetting is such that if the tab assembly remained in its "in" position when passing through the zone of the selected delivery station the shift pin thereof would not engage the clutch release lever 162. Hence, the station is provided with a cam 166 to be more fully described, the purpose of which is to shift the tab assembly from its "in" to its "out" position after the set tab thereof has actuated the station lever 145 and prior to the car ascending to the position in which its pin can engage the release lever 162. Cam 166 thus functions to return the tab assembly thereof to its "out" position and thereby effects resetting of the previously set tab thereof to its normal inactive position. With load delivery having resulted from the operation of the unloading arm as aforesaid, and with the car tab assembly having been reset to inactive position, the car passes out of the station and is available for reloading at any one advance dispatch station having a load ready for dispatch.

Generally similar mechanical connections between the driving unit and the station mechanisms on the descending side are employed except that the latter are arranged to meet the up-side-down conditions of car back plate and tab mechanism which the latter assume as the car travels on the descending side of the system.

Thus, with a descending car coming into the zone of the delivery station, which is at a higher level than the dispatch station, the same as on the ascending side, and, assuming a car tab has been set to effect unloading at the particular delivery station, the car tab engages the station finger 170 (Figs. 15A, 16A), carried by spindle 171 which is mounted both for rotary and axial movement in suitable bearings provided on the frame uprights. It will also be assumed that spindle 171 is locked in its rightmost position so that the station finger 170 lines up with the set car tab, as when there is available space on the delivery incline to receive a load destined to that station. Engagement of station finger 170 by the car tab effects rotation of spindle 171 which is transmitted through rod connections 172, 173, 174 to arm 175 of a shifter unit for effecting engagement of clutch elements 75D, 76D (Fig. 17). The shifter unit includes a spindle 176, one end of which is mounted in a bearing 177 extending from the differential unit casing 68, the other end being supported in a bearing carried by the station framework. Arm 175 is free to turn on spindle 176, being connected by spring 178 to one of the shifter arms 179 which, with its companion shifter arm 180, extends from spindle 176. Each of the shifter arms carries at its end a suitable boss 181 adapted to engage in a circular groove 182 formed in the male clutch element 75D. The spring 178 with spring clip 183 serves to render the shifter unit flexible in case of a jam, yet it is heavy enough to permit shifting of the clutch.

By the above described arrangement the set car tab of the descending car upon its engaging with the station lever 170 effects relative raising movement of arm 175 and hence movement to the right (Fig. 17) of the clutch element 76D into engagement with the companion clutch element 76D. Accordingly, shaft 70D is driven from sprocket 64 and its end crank 77D imparts rocking movement to rocker arm 85D, thus to actuate the reciprocating unloading mechanism throughout its cycle of movement from a retracted position to a load transfer position with reference to the descending car in which it picks off a load from the car and thence back to its retracted position. In its latter position the shelf of the reciprocating unloader is adapted to discharge its load onto the station incline.

Following actuation of the station mechanism as aforesaid, the car descending through the station zone travels past reset cam 185, to be described, the latter returning the car tab assembly to its normal "out" position and thereby resetting to inactive position the tab which just previously engaged the station lever 170. Upon return of the tab assembly to its "out" position, the shift pin 48 thereof lines up with the clutch release lever 186 (Fig. 16A) which operates (same as clutch lever 162, Fig. 24) to trip a holding latch 187 which functions through suitable lever arms and rod connections to hold clutch operating arm 175 raised following initial raising until the release lever is engaged are aforesaid. The vertical distance between the station lever 170 and release lever 186 is that required to maintain clutch elements 75D, 76D engaged only for the interval of station mechanism operation. Thereupon the empty car with its tab assembly in "out" position travels on to the next dispatch station where a load is ready for dispatch.

Considering now the mechanical connections between the driving unit and the dispatch station on the descending side, the car in coming into the zone of said dispatch station travels past spindle 190 (Fig. 15A) which is mounted for both rotary and axial movement in suitable bearings provided by the station framework. Assuming the car to be empty and its tab assembly in "out" position, shift pin 48 thereof engages clutch set lever 192 which is lined up with the pin when the spindle 190 is locked in its rightmost position, this on the assumption that there is a load ready for dispatch at the dispatch station and that the operator there has made a selection corresponding to the destination of the ready load. Engagement of clutch set lever 192 by shift pin 48 effects rotation of spindle 190, the latter by suitable linking rods 193, 194 being transmitted to clutch operating finger 195 (Figs. 26 and 27) and raising the latter. The finger 195 is fast on spindle 196, the latter carrying an arm 197 which, by a spring 198, is connected to shifter arm 199 of a shifter unit provided by said arm, its companion arm 200 and a sleeve 201 disposed on spindle 196. A spring clip 202 carried by the shifter arm 199 and operating against lever 197 functions to render the shifter unit flexible when jammed, yet is strong enough to transmit turning movement of lever 197 to the unit.

The shifter unit, when actuated as aforesaid, effects engagement of clutch elements similar to clutch elements 108, 109 (Fig. 20), thereby to actuate through driving chain 100D (Fig. 52) the dispatch station mechanism which, for the descending side, takes the form of a rotary unloader similar to the rotary loader employed in the delivery stations on the ascending side, as earlier stated. In the case of the rotary loading arm, however, the same is actuated in counter direction with reference to the rotary unloading arms, so that the rotary loading arms move downwardly in an arcuate path which intersects the path of car travel. Thus, a load disposed on the horizontal shelf of the loading arm is deposited due to relative lowering movement of the arm on the car as the latter describes its descending movement.

The shifter unit maintains the clutch engaged for the interval required to actuate the rotary loading arm throughout its full cycle of movement through the medium of a latch 204 which engages the nose portion of the operating finger 195 when the latter is raised. Release of the clutch is effected upon the car moving to a position in which its tab shift pin 48 engages clutch release lever 206, the latter being connected by link 207 with a rearwardly extending arm 208 turning with latch 204. Latch 204 is biased to turn in latching direction by a spring 209 operating between the end of the arm 208 and a fixed point of the framework. Upon engagement of shift pin 48 with clutch release lever 206, the latter, as well as the arm 208, is depressed, whereupon latch 204 is tripped and the operating finger 195 returns to its normal inactive position. In the latter position of the finger, shifter unit 199, 200, 201 disengages the clutch, it being understood that the spacing between clutch set lever 192 and the release lever 206 is such as to permit the desired cyclical movement of the loading arm of the station mechanism.

To shift the car tab assembly from its "out" to its "in" position and enable a tab thereof to be set in accordance with the operator's selection, a tab shift cam 212 is provided, being carried by the station framework in position to effect the desired tab shift to 'in" position prior to the tab assembly moving to a position in which a tab thereof is engageable by a station tab. Accordingly, the clutch release lever 206 is offset vertically from the clutch setting lever 192 so that the latter lines up with the tab shift pin 48 following shifting of the tab assembly to its "in" position.

*System requirements for load dispatch*

To effect dispatch of a load from any one of the dispatch stations, three station requirements must be satisfied. The first requirement is that an empty, rather than a loaded, car be approaching the particular dispatch station; the second requirement is that a load be ready for dispatch at the station; and the third requirement is that the operator shall have made a selection of the delivery station to which the ready load is destined.

The first system requirement, namely, that an empty car be approaching the particular dispatch station, is satisfied by the resetting of the tab assemblies to "out" position by cams, such as cam 166 on the ascending side and cam 185 on the descending side, with which all delivery stations are provided. By this tab reset feature, only empty cars can actuate the clutch set levers, such as lever 125 on the ascending side and the lever 206 on the descending side, with which all dispatch station zones are provided. This will be apparent when it is considered that the tab assemblies of all loaded cars are, during or immediately following loading thereof, shifted to their "in" position, due to the functioning of the tab shift cams 142 on the ascending side and cams 212 on the descending side. With the tab assemblies of loaded cars in their "in" position the actuating pins thereof clear the clutch set levers aforesaid and hence a loaded car will pass a dispatch station without actuating its station mechanism.

Considering now the operation of the shift and reset cams 142, 166 on the ascending side and of the like cams 212 and 185 on the descending side, the shift cam 142 (Figs. 28A, 29A) has a plate-like body portion, one side of which is defined by an outwardly extending flange 220, and the other side by an inwardly directed flange 221. The cam at its lower end is pivoted as at 222 to a frame bracket 223 and is normally biased to the inclined position shown by means of spring 224. Arranged to cooperate with the inwardly directed flange 221 is a stop pin 225. Normally the cam 142 is swingable clockwise against the bias of spring 224 about its pivot point 222, as when the shift pin 48 of a loaded car engages and wipes against the flange 220, or when an empty car passes the station without the pin 48 having engaged the cam set lever 125. However, upon the tab assembly pin 48 engaging the cam set lever 125 to engage clutch parts 75A, 76A through actuation of the associated shifter, the cam is locked against swinging movement by a pin 228 which is projectible through an opening in the bracket 223 to engage against the relatively outer face of the cam flange 221. When so engaged, swinging movement of cam 142 is precluded, and the cam accordingly functions to shift the tab assembly from its "out" to "in" position upon its shift pin 48 engaging against the outer face of the cam flange 220.

Locking pin 228 is normally retracted but, through its end connection with a lever 230 extending from spindle 133 and turnable with the latter (Fig. 13B), is projected into cam locking position upon rotary movement being imparted to spindle 133 in the operation of the clutch shifter unit. Thus it will be seen that the shift cam 142 is locked for every engagement of clutch elements 75A, 76A and, hence, for every actuation of the loader of the dispatch station with which it is associated. Upon disengagement of the clutch locking pin 228 is retracted, whereupon cam 142 may swing freely when engaged by the tab shift pin 48 of loaded cars or by the pins of empty cars passing through the station zone without actuating the loading mechanism thereof.

The reset cam 166 (Figs. 28B, 29B) associated with each of the delivery stations comprises a plate-like body portion having an outwardly directed side flange 234 and an inwardly directed side flange 235, the latter adapted to bear against a stop pin 236. A spring 237 biases the cam so that its flange 235 normally engages the stop pin 236. The cam is pivotally mounted as at 238 to a frame bracket 239 and is free to swing counterclockwise when the inner face of its flange 234 is wiped by the shift pin 48 of loaded cars destined to delivery stations other than the delivery station with which cam 166 is associated, or by the shift pin 48 of empty cars which are free to pass all delivery stations.

However, in the event of the approach to the particular delivery station of a car bearing a load destined thereto, and upon car tab engaging the station finger 145 to operate the station clutch through rotation of spindle 150, cam 166 is locked against swinging movement by a locking pin 240 having a normal retracted position but projectible through the framework bracket 239 into position in which it engages against the relatively inner face of cam flange 235. Movement of pin 240 to its locking position is effected through its end connection with a lever 241 carried by clutch spindle 150 for turning movement therewith. When locked as aforesaid, swinging movement of cam 166 is precluded and, upon the shift pin 48 of a tab assembly wiping the relatively inner face of cam flange 234, the assembly is reset or returned to its "out" position. As previously indicated, this return movement of the tab assembly effects resetting of the tab unit thereof which just previously actuated the delivery station mechanism.

With delivery having been effected, the empty car with its tab assembly reset in "out" position thereupon moves out of the station and is available for reloading. Upon disengagement of the station clutch, locking pin 240 is returned to its retracted position, whereupon cam 166 may swing freely until it is again locked upon the approach of a car bearing a load destined to the particular delivery station with which the cam is associated.

Figure 30A:
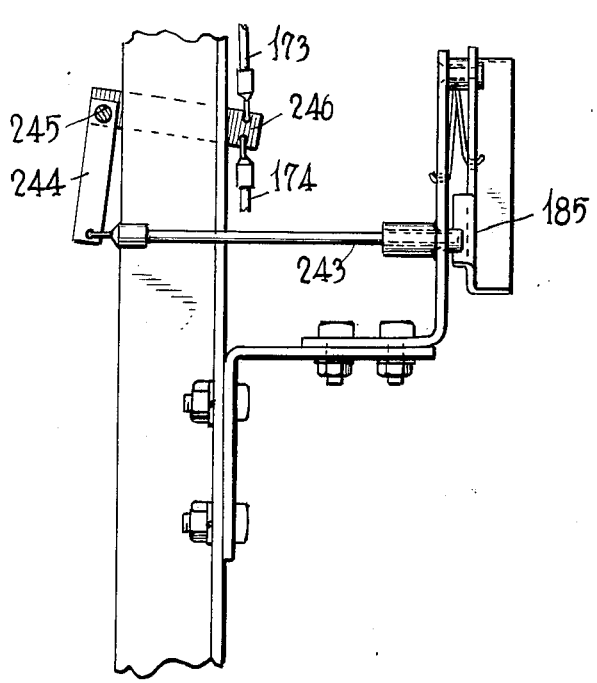
Figure 31A:
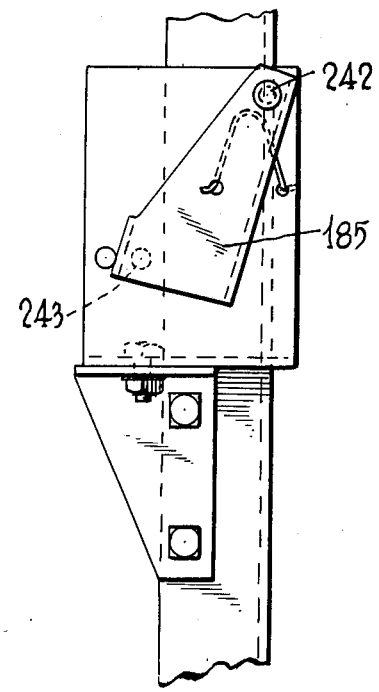
Figure 30B:
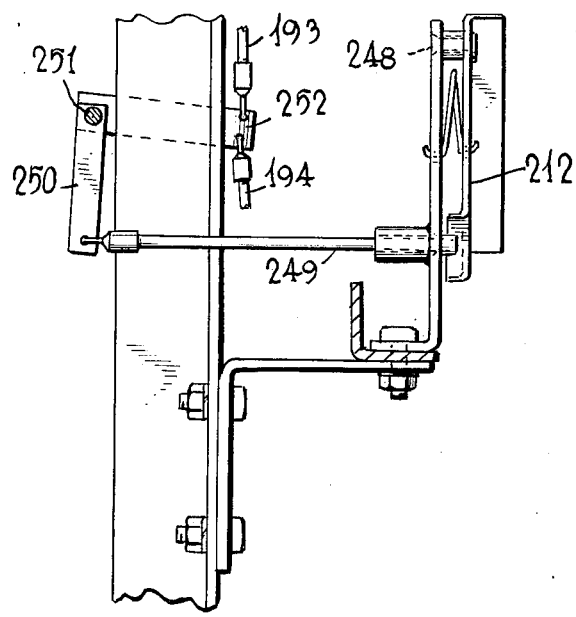
Figure 31B:
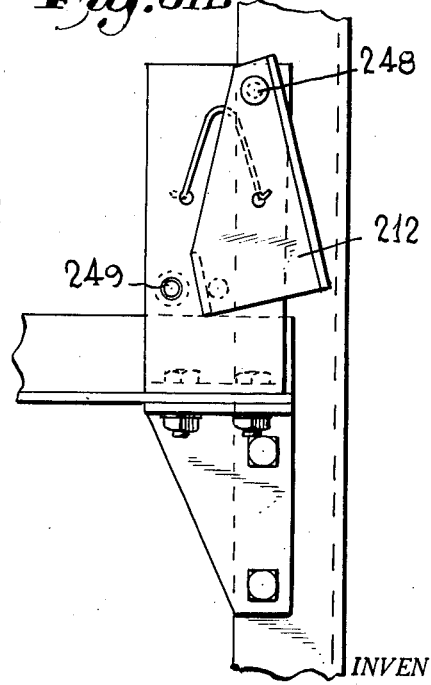

The reset and shift cams 185, 212 associated with each floor set of stations on the descending side operate in substantially similar manner, account being taken of the reversal incident to the up-side-down relation of car back plates and tab assemblies (Figs. 30A and 31A). Thus, reset cam 185 associated with the upper level discharge station is normally free to swing about its pivot 242 in counterclockwise direction, but upon locking pin 243 being actuated to its locking position, such swinging movement is precluded. The cam accordingly functions to shift the tab assembly of a car passing the same to its "out" position so that the car, following its unloading, may travel out of the station with its tab assembly conditioned for resetting.

The locking pin 243 is actuated from its retracted to its locking position through its end connection with arm 244 of a bell crank turning on a spindle 245, the other arm of which is connected intermediate rods 172, 173 for turning with spindle 173, the latter turning when the station finger 170 is engaged by a set car tab, as previously described. The locking pin 243 is returned to its retracted position upon release of clutch operating finger 175 and clutch parts 75D, 76D operated thereby.

The shaft cam 212 (Figs. 30B and 31B) associated with each dispatch station on the descending side is pivoted as at 248 for clockwise turning movement but is adapted to be locked against such movement upon projection of locking pin 249 to its locking position. When so locked, the cam functions to shift the tab assembly of a car passing the same to its "in" position to which it must be shifted for setting of one of the car tabs thereof.

Pin 249 is actuated from its normal retracted position to its locking position through its end connection with arm 250 of a bellcrank fulcrumed to the frame at 251, the other arm 252 of which is connected intermediate connecting rods 193, 194 to turn with spindle 190 carrying clutch set lever 192.

Hence, upon the approach of an empty car whose tab shift pin 48 is lined with clutch set lever 192 to engage the same, locking pin 249 is projected to its locking position and cam 212 is set to effect shifting of the tab assembly from "out" to "in" position. Locking pin is returned to its retracted position upon turning movement of spindle 190 and cam set lever 192 to their initial position.

To satisfy the second and third conditions aforesaid, the present invention provides interlocks whereby the loading mechanism of any one dispatch station is inoperative unless there is a load ready for dispatch at that station and unless the operator has made a selection of the delivery station to which the ready load is destined. This interlock, as applied to dispatch stations on the ascending side, will now be described.

Referring to Figs. 32, 33 and 34, each dispatch station on the ascending side is provided with a gravity incline formed by spaced channels 260, each carrying supporting rollers 261 on which a load or plurality of ready loads at the station are supported. The channels forming the incline are spaced somewhat in excess of the width of the loads and the incline, which is mounted on the frame structure, is disposed in alignment with the reciprocating station mechanism of the station.

To provide for step by step advance of the loads, and also to provide a stop effective against loads to the rear of the end load ready for dispatch, one channel of the incline carries a load sensitive arm 262 pivoted intermediate its ends as at 263. The forward end of the arm is sloped upwardly to extend well above the supporting rollers 261 and its rearward end 264 is bent upwardly to provide a load stop. With no load on the incline, the load sensitive arm 262 assumes a position as shown, in which it is held by a cam 265 having an extending arm 266 coupled with an extension on rocker arm 86 of the station mechanism by a link 267. Upon a load being placed on the incline and rolling to its endmost position, the load depresses the upwardly sloped end of the arm 262 and raises end 264, thus providing a stop for other loads disposed on the incline. Moreover, as the station mechanism is actuated throughout its cycle of movement, cam 265 is turned counter-clockwise due to its connection with the rocker arm 86 and causes the stop end of arm 262 to be positively raised, thus preventing travel of the next load to the endmost position during the interval that the station mechanism is operating. Upon return of the station mechanism to its retracted position the locking end of the arm 262 lowers, whereupon the next load may roll to the end position on the incline.

The channel of the incline also carries a feeler arm 280 which is turnable on the axis of mounting spindle 281, the latter fixedly carrying an arm 282 connected by a link 283 to one arm of a bellcrank 284. The other arm of the latter is connected by a rod 285 to one end of an equalizing bar 286, said bar being pivotally secured intermediate its ends through a king bolt or pin 287 to one arm 288 of a bellcrank carried by the framework bracket 289. The other arm 290 of the bellcrank is forked at its end to engage over pin 291 carried by spindle 126. The other end of the equalizing bar 286 is connected by rod 292 to an arm 293 of a bellcrank turning on a cross shaft 295 extending between the station side frames and mounted in station brackets 196. The other arm 297 of the bellcrank is connected by rod 300A to the selecting mechanism to be described.

Operation of the selecting mechanism results in axial movement of rod 300A to the left (Fig. 13A). This movement is transmitted through bellcrank 293, 297 and pull rod 292 to that end of bar 286 to which the pull rod is connected. Disposition of a ready load on the incline depresses feeler arm 280 which, through its connection with the other end of equalizing bar 286, also raises that end of equalizing bar. Accordingly, when both ends of the bar 286 are raised slightly, the intermediate king pin connection is also raised, and the bellcrank 288 turns in clockwise direction about its fulcrum, to shift spindle 126 axially to the left (Figs. 13A and 33). In this leftwise position of the spindle 126 the clutch set lever 125 carried thereby lines up with the tab shift pin 48 of an approaching empty car whose tab assembly is in "out" position. Hence, by the aforesaid interlock the station mechanism is conditioned for operation upon the approach of an empty car and the second and third system requirements are thereby satisfied.

In the event that no load is in position for dispatch on the station incline, feeler arm 280 remains raised and accordingly no raising movement is imparted to the associated end of equalizing bar 286, even though the selecting mechanism may be operated to impart raising movement to the end of the equalizing bar to which it is connected. In such event, the equalizing bar merely turns on the axis of king pin 287 without effecting clockwise movement of bellcrank 288, 290. Similarly, the positioning of a load on the incline, while it may effect raising of one end of equalizing bar 286, will have no effect in turning bellcrank 288, 290 clockwise unless the selecting mechanism is actuated to raise the other end of the equalizing bar. Under the latter conditions, spindle 126 is maintained in its rightwise position in which the shift pins 48 of empty approaching cars may clear the clutch set lever 125 without engaging the same.

Like system requirements must be satisfied for operation of dispatch station mechanisms on the descending side of the system. By reference to Figs. 35, 36 and 37, each dispatch station on the descending side is provided with a station incline 305, one channel of which carries load sensitive arm 306 pivoted intermediate its ends and having its rear end bent upwardly to provide a load stop 307 operative when the relatively forward end of the arm is depressed by a load disposed at the end of the incline ready for dispatch. The incline also carries a feeler arm 308 which is connected by an extension arm 309 and connecting rod 310 to an arm 311, the latter being carried at one end by a cross spindle 312 whose other end carries a lever 313 connected by a pull rod 314 with one arm 315 of a first bellcrank. The latter is carried by a frame bracket 316 and is resiliently held against clockwise movement by a spring 317 extending between its other arm 318 and the station framework. A connecting rod 320 is secured to the free end of the lever arm 318 and extends upwardly for connection with one end of an equalizing bar 321 fulcrumed intermediate its ends by a king pin 322 to one arm 323 of a second bellcrank, in turn fulcrumed on spindle 324 to a station bracket 325. Connected to the other end of equalizing bar 321 is a connecting rod 327, the latter being in turn connected to arm 328 of a third bellcrank turning on cross shaft 295. The other arm 330 of the latter bellcrank is connected by a push rod 300D to the selecting mechanism.

The other arm 332 of the second bellcrank has its free end bifurcated to engage over pin 334 carried by spindle 190, and upon the bellcrank 323, 332 being turned in clockwise direction spindle 190 is actuated axially to the right (Figs. 15A and 36) an amount such that its cam set lever 192 lines up with the tab shift pins 48 of empty descending cars. In its normal position, however, bellcrank 323, 332 maintains spindle 190 in its leftwise position in which the shift pins of empty cars may clear the clutch set lever 192 in passing the same.

From the above described arrangement, it will be understood that actuation of the station selecting mechanism of a dispatch station on the descending side acts to raise one end of equalizing bar 321 through bellcrank 328, 330 and push rod 327. Similarly, a load ready for dispatch on the station incline results in upward movement of connecting rod 320 and hence raising movement of the other end of equalizing bar 321. Accordingly, king pin 322 is raised to effect limited clockwise movement of the bellcrank 323, 332 for the stated purpose. In the event that only one condition is satisfied, as where a selection has been made with no load ready for dispatch, or where a load is ready for dispatch but no appropriate selection of load destination has been made, equalizing bar 321 merely turns on the axis of king pin 322, with this turning movement having no effect in shifting spindle 190 to the right.

*System requirements for load delivery*

To effect load discharge, two system requirements must be satisfied. The first is that a car bearing a load destined to a particular discharge station shall arrive at that station, and this requirement is satisfied in the present system by providing each discharge station with a station lever, such as the lever 145 on the ascending side, and the lever 170 on the descending side, whose positioning is individual to that station. Such individual positioning of station levers is readily effected by disposing the levers on the station spindles corresponding to spindles 146 and 171 at predetermined spaced intervals along the length thereof. By appropriately positioning each of the tabs of the car assemblies thereof so that a tab lines up with a particular station lever only, there is assured the desired actuation of the station lever of the selected station upon arrival thereat of a car whose tab setting corresponds therewith.

The second system requirement for unloading is that the unloading or discharge inclines with which each discharge station is equipped shall provide available space to receive at least one load. To this end the discharge inclines 340 (Figs. 38 and 39) for all delivery stations on the ascending side of the system are each provided with a load feeler arm 341 pivotally carried by one of the side channels of the incline, the feeler arm being positioned in the space required to receive at least one load. The arm has a fixed extension 342 which is connected by a pull rod 343 to an arm 344 fixedly carried at one end of a cross spindle 345, the spindle at its other end carrying arm 346. Connected to the end of the latter is a push rod 347 extending to lever 348 fulcrumed through a spindle mounting 349 in a frame bracket 296. The spindle 349 carries an arm 350 connected to spindle 146 carrying the station lever 145. Thus, with loads piled up on the station incline and the last load depressing feeler arm 341, arm 350 is actuated to the left to move spindle 146 to the left. In this latter position a car bearing a load destined to the particular station may pass the same without engaging station lever 145. On the other hand, if feeler arm 341 is raised, indicating sufficient space on the incline to receive the load, spindle 146 is actuated to its normal rightmost position in which its station lever 145 lines up with the set car tab, with engagement therebetween effecting operation of the station mechanism and discharge of the load on to the station incline.

For discharge stations on the descending side, the station inclines 352 (Figs. 40 and 41) are each provided with a feeler arm 353 which is in raised position when the incline has available space for a load to be discharged but which is depressed by the last load of an accumulation of loads on a filled incline. The arm 353 is provided with an extension 354 which is connected by push rod 355 with one arm 356 of a bellcrank fulcrumed in a frame bracket 357. The other end 358 of the bellcrank is forced to engage a pin 360 carried by spindle 171, the latter carrying station lever 170. With the feeler arm 353 raised, bellcrank 356, 358 is maintained in its normal position and in turn maintains spindle 171 in such position that its station lever 170 lines up with a set tab of a descending car having a setting corresponding to the station lever. With feeler arm 353 depressed, bellcrank 356, 358 is turned in counter-clockwise direction and shifts spindle 171 to the left, whereupon station lever 170 is out of line with the set tab of a descending car which would normally actuate the station lever.

The invention further contemplates the identical relative positioning of the station levers of the two discharge stations located on the same floor, one on the ascending and one on the descending side of the system. Thus, if a load dispatched from the first floor and destined for the fourth floor, for example, passes the fourth floor delivery station on the ascending side due to the inability of that station incline to receive the load, the load is carried over the top and down the descending side to the fourth floor delivery station having the same station lever positioning. Assuming that the fourth floor delivery station on the descending side can receive the load, the load is discharged thereat, but in the event that station is also loaded and unable to receive the load, the load is recirculated around the system until either one of the fourth floor delivery stations can receive the same.

*Selecting mechanism—Single dispatch*

Considering now the selecting mechanism with which each floor set of stations is provided and which, upon setting, effects setting of the station tabs to be described, the latter in turn functioning to set a car tab in accordance with the operator's selection, a selecting mechanism of the push button type and operating on the single dispatch system will first be described by reference to Figs. 42, 43 and 44.

The floor set framework carries a push button panel 375 supported on side brackets 376 and preferably disposed at a level which is conveniently accessible to the operator and in the space between the inclines serving the ascending and descending sides of the floor set of stations. Arranged along one side of the panel is a row A of push buttons 377 for floors on the ascending side of the system and arranged along the other side of the panel is a row D of push buttons for floors on the descending side of the system. The selecting mechanism under description is one with which the first floor of a twelve story building, including the ground floor, is equipped. There being no requirement for a button corresponding to the first floor, row A of buttons contains buttons numbered 2 to 11 operating in tandem and corresponding to the second through the eleventh floors, all above the first floor level. In addition, row A contains, near the bottom of the panel, a reset button 378A, the function of which is to permit resetting of a selection in case the operator desires to revise a previously made selection.

As shown, row D contains only one button designated G corresponding to the ground floor, which is the only floor below the first floor on the descending side of the system. In a selecting mechanism for installation on the tenth floor of the building, for example, row D would contain buttons designated from 9 to 1 and G to correspond to the ten floors at the lower level.

The side bracket 376 adjacent the row A supports vertically extending rods 379, 380 which are turnable in the bracket. Carried by rod 379 is a U-shaped interlocking bar 381A, the latter carrying bracket 382, to which is connected the rod 300A which, as above indicated, is connected through bellcrank 297, 293 and rod 292 with equalizing bar 286.

Carried by rod 380 is a locking bail 384A, the free end of which is aadpted to engage behind the shouldered end of any one of the push buttons 377 of column A upon depression of the button. Thus, locking bar 384A maintains a button depressed until the relatively lower bail is turned counter-clockwise (Fig. 44) thereby to clear the button shoulder and permit the button to return to its initial position.

Resetting of any one of the buttons can be effected manually by the operator through the reset button 378A, should the operator desire to revise a selection, and is also effected automatically upon completion of the dispatch operation for a load to which the button corresponds and the transfer of the selection to the car receiving the particular load. For manual resetting, the reset button has a pin connection with lever 386A, the latter being fast with rod 380. Thus, as reset button 378A is manually depressed by the operator, lever 386A is turned counterclockwise (Fig. 44) and bail 384A moves away from the shouldered end of the previously set button, whereupon the latter button returns to its initial position. Automatic resetting of a previously set button is effected through a wire 388 which is connected at one end to the free end of lever 386A, and at its other end to a lever 390 pivotally connected to the station framework (see Fig. 13B) and adapted to be engaged by a lug carried by connecting arm 80 of the drive between crank arm 77A and the reciprocating station mechanism. The arrangement is such that lever 390 is engaged by arm 80 as the latter on its return stroke nears its initial position following substantial completion of the cycle of the reciprocating station mechanism. Such engagement results in a pull on connecting wire 388 and the latter through lever 386A is translated into turning movement of rod 380, the latter moving bail 384A out of button locking position, whereupon the previously set button is reset to its initial position.

The vertical leg of the interlocking bar 381A is positioned to engage the end of push buttons of the row A, and when any one push button is pushed in, the interlocking bar is turned counter-clockwise, with the result that connecting rod 300A is moved axially to turn bellcrank 297, 293 counter-clockwise (Figs. 13A and 13B) and thereby raise one end of equalizing bar 286 for the previously stated purpose.

Referring to Fig. 44, there is illustrated the interconnection between laterally disposed buttons of a row, it being understood that the two parallel half rows of buttons are referred to herein as a single or full row. The arrangement is so that for such laterally disposed buttons of half rows, the interlocking bars 381A, 381a are paired by an end connection, with interlocking rod 300A being secured to both at the common point of connection. Similarly, the reset levers 386A, 386a are paired by an end connection so that one reset button suffices for the two half rows of buttons, with wire 388 being connected to both.

The operation of buttons in column D for floors on the descending side of the system is the same as that described for buttons corresponding to floors on the ascending side, it being understood that a suitable reversal of parts is required to provide for the righthand condition on the descending side. It is to be noted, however, that for buttons in column D the lever 386D of the reset mechanism is connected to a lever 394 pivoted to the station framework (see Fig. 13B). Lever 394 is disposed in the path of a lug 395 carried by shaft 103 of the rotary unloading mechanism for delivery stations on the descending side. The position of lug 395 is such that the latter engages lever 394 upon completion of the cycle of the rotating unloader, thereby to exert a pull on wire 392 which effects movement of locking bail and consequent resetting of the previously set button of column D in automatic manner.

The interlocking bar 381D for the buttons of column D thereof is connected by rod 300D, corresponding to rod 300A, the latter being connected to operate bellcrank 328, 330 to raise one end of equalizing bar 321 upon a selection having been made.

Preferably, the ends of the rod 300A, 300D are hooked into the ends of bellcrank lever arms 297 and 330, respectively, in the manner illustrated in Figs. 45 and 46, said arms being mounted from separate sleeves turning in suitable bearings on the axis of cross shaft 295. From said sleeves the bellcrank arms 293 and 328 extend for connection as aforesaid with their associated equalizing bars.

Each of the push buttons 377 is connected to one end of an axially movable rod 400, the other end of which connects with an arm of a bellcrank 401 whose other arm is connected to a pull wire 402 extending downwardly to the station tab mechanism.

Referring to Figs. 47, 48 and 49, of which Fig. 47 is illustrative of a station tab assembly generally, Fig. 48 illustrating the station tab mounting for assemblies thereof on the ascending side, and Fig. 49 illustrating the station tab mounting for assemblies on the descending side, each tab assembly is mounted in vertical alignment with and adjacent the path of travel of the car tab assemblies on bar 404 supported from the station framework. The station tab assembly comprises a plurality of independently mounted tab units, each including a tab 405A extending from a sleeve 406 turnable on spindle 407 against the bias of a torsion spring 408. A U-shaped stop bar 409A extending across and in the path of the rear end of all tabs of the assembly is swingably mounted on spindle 407 and is normally held against stop pin 410 by a spring 411 attached to the assembly frame.

A cross spindle 412A mounted in suitable end brackets extends across the assembly and to the rear thereof and has secured thereto a flat holding bar 414A which normally extends under the rear ends of the station tabs 405A to act as a stop and support therefor when the latter are in their normal inactive position. For station tab assemblies on the ascending side, each of the pull wires 402 connects to a station tab at a point 415 intermediate its operating end and its point of support on spindle 407. Hence, as a pull wire 402 is moved upwardly as a result of pushing on any one of the push buttons 377, the corresponding station tab 405A is urged upwardly. A coil spring 416 is connected in each of the pull wires 402, so that any one push button can be pushed in, thereby to condition the corresponding tab 405A for turning movement about spindle 407 prior to movement of holding bar 414 away from the rear end of the so-conditioned tab.

Spindle 412A carrying the holding bar is extended rearwardly beyond the side frame of the station tab assembly and has secured thereto an offset crank arm 418A carrying at its end crank pin 419A, the latter seating in a recess 420 formed at the end of the clutch operating finger 128 (Fig. 22). As said finger is raised by engagement of clutch set lever 125 and shift pin 48, crank pin 419A also is raised to effect rotation of spindle 412, thus to clear holding bar 414 from the end of the tab which has been conditioned for operation. Accordingly, the relatively forward end of station tab 405A is raised to its active position in which its rear end engages against the flat upper surface of the stop bar 409A. In such position the station tab is adapted to line up with and engage the dog 55 of one of the car tab units, and to turn the car tab to its active position illustrated in Fig. 12. Inasmuch as the act of pressing on one of the push buttons 377 constitutes a selection of the delivery station to which a ready load is destined, this selection is transferred by the set station tab 405A to the car to which the ready load is transferred, and the car thereupon continues its path of travel with one of its tabs set to active position, in which it is adapted to engage the station lever of the delivery station to which the load is destined in accordance with the operator's selection.

Upon resetting of the push button, the set station tab is returned to inactive position by spring 408 whereupon stop bar 414 swings in under the same due to lowering movement of the clutch operating finger 128.

In case of jamming of the station and car tabs, stop bar 409A may lower, through the action of spring 411, to permit the forward end of station tab to raise until it clears the car tab. Spring 411 is strong enough, however, to hold the stop bar against stop pin 410 for all normal conditions.

The station tab assemblies for dispatch stations on the descending side of the system operate in generally similar manner, account being taken of the reversal required by the up-side-down relation of the car tab assemblies as the cars travel on the descending side. Referring to Fig. 49, wherein one tab of a station assembly thereof for a dispatch station on the descending side is illustrated, tab 405D in its normal position has its forward end pointing upwardly and its rearward end held by a stop bar 414D. The latter is carried by a spindle 412D mounted for turning movement, the end of which carries a crank arm 418D (see Figs. 15B and 16B) connected by a link 421 with arm 252 of bellcrank 250, 252. As the latter is turned counter-clockwise in the operation of the station clutch 108, 109 (and also to lock shift cam 212) holding bar 414D is swung away from the end of tabs 405D. Hence, any one of the tabs which has been conditioned for operation by the depression of a corresponding push button may turn to its set or active position in which it is held by stop bar 409D. With the car tabs in their dotted line position in Fig. 11, as results from reversal of the car back plate in making the upper turn, the active station tab 405D engages the dog 55 of a corresponding car tab unit to turn its tab 53 to the active position shown in dotted lines in Fig. 12. Thereupon, the car picks up the load for which the selection has been made and with the latter being transferred to the car, the loaded car continues to move along its path of travel until it arrives at the selected delivery station. At that station the set car tab actuates the station lever to initiate operation of the station mechanism throughout its cycle of movement and, as a consequence, to effect delivery of the load.

Operation

The operation of the system so far described will now be briefly outlined. An operator at any one of the dispatch stations having loads to be dispatched places a load on the station incline, whereupon it automatically flows to a ready position thereon, or is advanced to such position as loads ahead of it are dispatched. Either after placing the load on the incline or prior thereto, the operator presses one of the push buttons 377 corresponding to the floor at which the load is to be delivered. Assuming both of these operations to have been completed, the first empty car, with its tab assembly in "out" position, in moving into the zone of the dispatch station at which the operator is located, effects engagement of the clutch elements 75A, 76A, if the dispatch station is on the ascending side of the system, or of clutch elements corresponding to 108, 109 if the station is on the descending side of the system. Thereupon the station mechanism of the particular station is actuated throughout its cycle and transfers its load to the car. In moving through the station zone the operator's selection is transferred to the car tab assembly thereof and one of the car tabs corresponding to the operator's selection is set to its active position. Following transfer of the load to the car, the actuated push button is automatically reset so that the selecting device is immediately available for a following selection corresponding to another load flowing to ready position on the station incline. The car with its load now moves out of the station and continues its travel until it reaches the selected delivery station.

In moving into the station zone of the latter, the car tab actuates the station lever to cause engagement of clutch elements 108, 109, if the selected receiving station is on the ascending side of the system, or of clutch elements 75D, 76D if the selected receiving station is on the descending side of the system. Engagement of the clutch as aforesaid causes the unloading mechanism at the selected delivery station to operate throughout its cycle and thereby to effect transfer of the load from the car to the delivery station incline, whereupon it tends to flow by gravity down the incline, this under the assumption that loads are not piled up on the incline and that the incline has available space to receive the load.

In the event that the incline of the more direct delivery station is filled and thus unable to receive the load, the car passes the more direct station without operating the station mechanism thereof and recirculates part-way around the system until it arrives at the delivery station at the same floor but on the other side of the system. Assuming the station incline at the latter delivery station has space available for the load, the station mechanism thereof is caused to operate and the load is accordingly transferred from the car thereto. If the latter station incline is also filled, the car continues to circulate until one of the delivery mechanisms of the two delivery stations at the selected floor can operate.

In the event the operator, through error, makes a selection as by depressing a wrong push button, he may reset the selecting device by manually pressing on the reset button 378. Or if the operator presses a button without having a load ready for dispatch, the interlock as described permits an empty car to pass the operator's station without operating the mechanism thereof. The interlock further insures that even though a load is ready for dispatch on a dispatch station incline, empty cars can pass the station mechanism when the operator fails to make a selection corresponding to the destination of the load.

In the described embodiment of the invention, in which the system is designed to service twelve floors of a building, each car tab assembly comprises twelve tab units, one unit corresponding to each floor of the building. Similarly, the station tab assembly comprises a base number of twelve station tabs each adapted to set a particular car tab to active position, although the station tab assemblies for dispatch stations on the ascending side may omit tabs corresponding to floors below, and station tab assemblies for dispatch stations on the descending side may omit tabs corresponding to floors above the same. Likewise, each delivery station control as shown is of the type to be rendered effective by a single station lever to be engaged by a set car tab corresponding thereto. It is to be understood, however, that the system of the present invention is not limited to tab assemblies, either car or station, which operate singly, nor is the invention limited to systems servicing only twelve story buildings. On the other hand, the system described may provide service for buildings having a lesser number of floors by the relatively simple expedient of providing car and station tab assemblies with tab units in number corresponding to the lesser number of building floors. For buildings having a greater number of floors the tabs can be operated in combinations of two or three rather than singly. For example, tab assemblies made up of eight tabs operating in combinations of two can service a twenty-eight story building. It is obvious that any base number of tabs other than eight or twelve as suggested can be used in single, double or even triple settings.

Accordingly, the system as described, particularly as to the number of floors served thereby and the arrangement and number of tabs and selections permitted by the selecting device, is to be regarded as suggestive only of systems constructed and operating in accordance with the invention for servicing any desired number of building floors.

*Selecting mechanism—Multiple dispatch*

In addition to the single dispatch of loads provided by the push button type selecting means as described, the present invention also contemplates a modified form of selecting mechanism operating on the principle of multiple dispatch of loads, the term "multiple dispatch" being employed to designate selecting mechanism by which an operator at a dispatch station who has a succession of loads ready for dispatch may place the same on the station incline and thereupon make a succession of selections corresponding to the loads and their destinations. Thereupon the operator may leave the station as he is under no requirement to make a selection preliminary to each dispatch operation. On the other hand, the approaching empty cars successively pick up the loads of the succession thereof and the selecting means operates to transfer in automatic manner the succession of selections to the succession of cars picking up the loads.

In the multiple selecting mechanism to be described, provision is made for setting up a succession of selections, say six in number, such being representative of the maximum number of loads an operator would be required to dispatch at one time. A lesser number of selections, as required by an operator having only three loads to dispatch, for example, does not change the operation of the selecting mechanism and the arrangement is further capable of being added to as may be required to take care of a greater number of selections in the event that a number of loads greater than six is to be dispatched at any one time.

Referring to Figs. 50 and 51 illustrating the details of the selecting mechanism, and to Figs. 52 and 53 which illustrate the drive therefor as well as the manner in which the mechanism is organized with a floor set of stations, the multiple selecting mechanism as aforesaid incorporates a two-section drum, one section A, such as the left-hand section, providing for the selection of floors on the ascending side of the system, and the righthand drum section D providing for selection of floors on the descending side of the system.

Considering first the drum section A, the latter, by reference to Figs. 50 and 51, is constituted by a sprocket 425A carrying along its periphery a plurality of pins or bolts 426A, which are equally spaced circumferentially. Supported on the pins 426A are a plurality of selector rings 427A, in number corresponding to the number of floors above the particular floor at which the selecting mechanism is located. Assuming a selecting mechanism made up for location on the first floor of a twelve-story building, including the ground floor, ten such rings are provided as shown, one for each of the floors above the first floor. If the selecting mechanism is for use on the sixth floor, for example, drum section A of the mechanism would be provided with five such selecting rings.

The drum section, including sprocket 425A, its pins 426A, and the selector rings 427A mounted on the latter, is carried by a sleeve 428A turning on a fixed cross shaft 429.

For a selecting mechanism located on the first floor as aforesaid, drum section D is constituted by a sprocket 425D carrying along its periphery the circumferentially spaced pins 426D providing support for a single selecting ring 427D. Such single ring corresponds to the ground floor which is the only floor located below the first floor at which the particular selecting mechanism is located. For a sixth-floor selecting mechanism, drum section D would be made up of six rings 427D corresponding to the fifth, fourth, third, second, first and ground floors. In the latter case, pins 426D would be made sufficiently long so as to provide support for six selecting rings. Drum section D including its sprocket 429D and selecting ring or rings 427D is fixedly mounted on sleeve 428D turning on cross shaft 429.

Operatively arranged on each of the selecting rings 427A, 427D is a circumferential series or lane of setting fingers 430, each provided at one side thereof with an inwardly directed tongue 431 through which pins 426A (or 426D) extend.

The fingers are mounted to turn on the axis of the pins from an inactive position to their set or active position and are each resiliently maintained in either their inactive or set position by an over-center spring 432, one end of which is seated in a recess of the finger tongue 431, the other end being wrapped around the advanced pin 426A (or 426D). For the purpose to be hereinafter described, the fingers of the circumferential series thereof are spaced a predetermined distance corresponding to the advance rotary movement imparted to drum sections for each actuation of the station mechanism with which the sections are associated.

The drum sections A and D are partially enclosed within a housing having a vertical guard 434, from which may extend supporting arms 435 (Fig. 50) carrying the cross shaft 429. Enclosed within the housing is a supporting cross arm 436 which carries a bracket 437 extending downwardly between the drum sections and which is provided at its lower end with a hub 438 through which cross shaft 429 extends. The bracket thus provides a support for the shaft intermediate its ends.

Bracket 437 also provides support within the drum sections for a spindle 440 and arranged thereon for turning movement is a sleeve 441A extending into drum section A and a second sleeve 441D extending into section D of the drum. Secured to sleeve 441A are the upwardly and downwardly extending lever arms 442A, 443A. At its upper end arm 442A carries a transverse interlock pin 444A, the latter being of length as to extend across all of the selector rings of drum section A. Carried by sleeve 441D are the like upwardly and downwardly directed lever arms 442D, 443D. At its relatively upward end lever arm 442D carries a transverse interlock pin 444D of length to extend across the single selector ring of drum section D. With drum section D being provided with more than a single ring, pin 444D is of length as to extend across all of such rings.

Bracket 437 also carries a trip or reset pin 445 extending across and common to both of the drum sections A and D.

Enclosed within the housing are a plurality of fingers 446 mounted for turning movement on fixed shaft 447 extending across the housing. The lower end of the fingers 446 are adapted to be engaged by the upwardly extending ends 430a of the fingers 430 when the latter are in their set position, the fingers 446 being lined up with and corresponding in number to the number of selector rings of the drum sections A and D. At their relatively upper ends fingers 446 each have a connection with a pull wire 448, the latter being enclosed in a suitable flexible tubing and each wire extending to a corresponding station tab 405. The fingers 446 which correspond to the selector rings 427A of drum section A are arranged to actuate the tabs 405A of the station assemblies thereof associated with dispatch stations on the ascending side of the system. The fingers 446 associated with the selector ring or rings 427D of drum section D are related to station tabs 405D of the assemblies thereof associated with dispatch stations on the descending side of the system. It will be understood that the pull wires 448 correspond to the pull wires 402 operating between the push button selecting device and the station tabs in accordance with the prior description.

Connected to the lower end of the lever arm 443A is a rod 450A extending to bellcrank arm 297 of the interlock mechanism which, for the drum type selecting control, extends downwardly rather than upwardly. Accordingly, rod 450A corresponds to rod 300A of the push button interlocking mechanism previously described. Connected to the lower end of lever arm 443D is a rod 450D extending to and connected with arm 330 of bell crank unit 328, 330 of the interlock mechanism. Hence, 450D corresponds to the previously described rod 300D of the push button interlocking mechanism.

By reference to Figs. 52 and 53, it is apparent that sprocket 425A of drum section A is driven to impart advance movement to the drum corresponding to the distance between two fingers of the circumferential series thereof by a chain 452A meshing with small sprocket 453A coupled to a large diameter sprocket 454A, both sprockets being mounted and free to turn on shaft 295. Disposed above the shaft is a jack shaft 455A carrying a sprocket 456A, the latter being lined up with a pinion 457A fast on shaft 70A (Fig. 17) of the station driving unit. A drive chain 458A connects the sprockets 456A, 457A and meshes with sprocket 454A. Hence, upon engagement of clutch element 75A, 76A (Fig. 17) to actuate the reciprocating station mechanism of a dispatch station on the ascending side of the system, sprocket 425A of the selecting mechanism associated with said station is given corresponding movement. By suitably selecting sprocket ratios, engagement of clutch elements 75A, 76A advances sprockets 425A and hence the fingers 430 moving therewith a distance corresponding to the spacing between two fingers of a circumferential series thereof.

Sprocket 425D of the drum section D is driven by chain 452D meshing with small sprocket 453D coupled with a large diameter sprocket 454D, both turnably mounted on shaft 295. Sprocket 454D is connected by driving chain 460D with sprocket 463D fast on shaft corresponding to shaft 103 (Fig. 20), the latter carrying the rotary loading arm of the station mechanism of dispatch stations on the descending side of the system. Hence, as the clutch elements corresponding to elements 108, 109 of the rotary loading mechanism are engaged, pinion 425D of drum section D is driven from sprocket 463D. Sprocket ratios are selected so that engagement of the clutch elements 108, 109, as aforesaid, advances drum section D the angular distance corresponding to the spacing between two fingers 430 of the series thereof.

Both drum sections A and D have a normal or "rest" position in which the fingers 430 of the topmost cross row thereof (the row just to the right of guard 434, Fig. 51) are adapted when set to active position to turn levers 442A, 443A (or 442D, 443D) counterclockwise, thus to actuate interlock rod 450A (or 450D) to the right and thereby condition the station for operation. Such lever movement is accomplished by so positioning interlock pins 444A and 444D that either one of the pins is engaged and moved slightly to the left by the tongue 431 of any one of the set fingers of the topmost row thereof, thereby to move rods 450A or 450D to the right. With the station rendered operative and with a load ready for dispatch on the station incline, the first empty car moving into the station zone effects operation of the station clutch and also operation on the station mechanism in the previously described manner and, moreover, advances the drum section as aforesaid. In this advance movement of the drum section (movement to the left), the said finger tongue 431 moves away from the interlock pin 444A (or 444D) with which it was in engagement to release the interlock; thereafter the upwardly directed end 430a of the set finger engages the lower end of a corresponding finger 446 and causes the latter to turn clockwise and, finally, the end 430a of the finger rides out of engagement with the finger 446 whereupon the latter returns to its initial position.

The aforesaid clockwise movement of finger 446 pulls wire 448 axially to the right and in turn effects movement to its set position of a corresponding tab 405A (or 405D) of the associated station tab assembly. The advance movement of the drum also brings the previously next from the top row of selecting fingers 430 into position so that any set finger of the row thereof will engage the interlock pin 44A (or 444D), thereby to again render the station operative. In this connection, it will be understood that for any operation of the selecting mechanism, whether for single or multiple dispatch, the operator must set a finger 430 in the topmost row of fingers, for a single dispatch of loads, and, for multiple dispatch, must start his settings from a finger in the topmost row thereof, in order to render the station operative. Otherwise the interlock functions in intended manner to render the station inoperative. It will also be understood that the relative positioning of and the spacing between the aligned interlock pins 444A and 444D and the fingers 446 is such as to insure that the interlock permits operation of the station clutch at the proper time, as well as the properly timed operation of the station tab mechanism in reference to a car passing through the station zone.

The diameter of the drum sections is such as to provide a setting segment readily accessible to the operator and which corresponds to the arc containing six selecting fingers of a circumferential series thereof, where six is the maximum number of loads to be dispatched at any one time.

The operation of the multiple selecting device as described will now be outlined, assuming that the device is located on the first floor and that the operator at the first floor has six loads on the station incline ready for multiple dispatch. If the first load is to be assigned to the third floor, the operator sets a finger 430 of the topmost cross row thereof and of the second selector ring counting from the left. With the second load assignable to the fourth floor, the operator sets a finger 430 of the second cross row thereof and of the third selector ring from the left. This setting operation is continued until one finger in each of the six horizontal rows thereof making up the setting segment has been set in the lanes or series corresponding to the load destinations. As a succession of empty cars come into the station zone, the drum section A (where all finger settings correspond to delivery floors on the ascending side of the system) is given a succession of advance movements, with the result that the set fingers are successively brought into position to effect a plurality of actuations of the fingers 446 and of the station interlock. The actuations of the interlock condition the station mechanism for operation in advance of each dispatch operation and accordingly the dispatch mechanism is operated once for each finger setting, both to transfer the succession of loads to approaching cars in condition to receive the same and also, through the succession of advance movements given the drum section A, to render the finger settings successively active. Actuations of the fingers 446 effect settings of corresponding station tabs 405A which are successively transferred to the car tab assemblies of the approaching cars.

When the loads are destined for floors lower than the sending floor, appropriate fingers of the drum section D are set to their active position as aforesaid and a like operation of the station mechanism of the dispatch station on the descending side of the system results. As drum sections A and D operate independently of each other, they can operate simultaneously without interference.

The selecting mechanism as described is thus interrelated with its station mechanism actuating means so that the dispatch mechanism is operated once for each of the finger settings of the succession thereof, and the finger settings are successively rendered active to transfer their settings to the tab assemblies of cars picking up the loads both in the order of the loads to which the settings correspond and responsively to the actuations of the dispatch station mechanism.

As many changes could be made in carrying out the above constructions without departing from the scope of the invention, it is intended that all matter contained in the above description or shown in the accompanying drawings shall be interpreted as illustrative and not in a limiting sense.

I claim:

1. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars, and a single drive unit for each floor set of stations operative to drive all station mechanisms of the station set thereof from the conveyor chain.

2. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars, and a single drive unit for each floor set of stations, said drive unit including sub-drives each individual to a station of the set and operative to drive the station mechanism thereof from the conveyer chain.

3. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars, a single drive unit for each floor set of stations, said unit including normally ineffective sub-drives each individual to a station of the set and adapted when rendered effective to drive the station mechanism thereof from the conveyer chain, and car-controlled means operatively related to each sub-drive for rendering the same effective.

4. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars, a single drive unit for each floor set of stations, said unit including normally ineffective sub-drives each individual to a station of the set and operative when rendered effective to drive the station mechanism thereof from the conveyer chain, means responsive for its actuation to the approach of an empty car thereto, to the presence of a load ready for dispatch thereat and to a selection of the destination of the ready load for rendering effective the sub-drive for the station mechanism of any one of the dispatch stations, and means actuated by a car bearing a load destined thereto for rendering effective the sub-drive for the station mechanism of any one of the delivery stations.

5. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars, a single drive unit for each floor set of stations, said unit including normally ineffective sub-drives each individual to a station of the set and operative when rendered effective to drive the station mechanism thereof from the conveyer chain, means responsive for its actuation to the approach of an empty car thereto, to the presence of a load ready for dispatch thereat and to a selection of the destination of the ready load for rendering effective the sub-drive for the station mechanism of any one of the dispatch stations, and means responsive for its actuation to the approach of a car bearing a load destined thereto and to the ability of the station to receive said load for rendering effective the sub-drive for the station mechanism of any one of the delivery stations.

6. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars and operating therefor, each dispatch station including means for effecting actuation of its station mechanism operating means upon the approach of an empty car thereto and an interlock for rendering said last means inoperative when the system requirements for load dispatch are unsatisfied.

7. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars and operating means therefor, each dispatch station including means for effecting actuation of its station mechanism operating means upon the approach of an empty car thereto and an interlock effective upon either the absence of a load ready for dispatch or upon failure to make a selection of the distination of the ready load for rendering said last means inoperative.

8. A vertical conveyer system providing direct service between the several floors of a building served thereby comprising, in combination, an endless conveyer chain having ascending and decending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars and operating means therefor, each delivery station including means for effecting actuation of its station mechanism operating means upon the arrival thereat of a car bearing a load destined thereto and an interlock for rendering said last means inoperative when the system requirements for load delivery are unsatisfied.

9. A vertical conveyer system providing direct service between the several floors of a building served thereby comprising, in combination, an endless conveyer chain having ascending and decending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars and operating means therefor, each delivery station including means for effecting actuation of its station mechanism operating means upon the arrival thereat of a car bearing a load destined thereto and an interlock effective upon the inability of said station to receive the load destined to it for rendering said last means inoperative.

10. A vertical conveyer system providing direct service between the several floors of a building served thereby comprising, in combination, an endless conveyer chain having ascending and descending runs extending between the several floors, driving means therefor, load conveying cars carried by said chain for travel therewith, a set of floor stations for each of the several floors including a delivery and a dispatch station adjacent the ascending run and a delivery and a dispatch station adjacent the descending run of the conveyer, said stations each including mechanism movable into and out of a load transfer position with reference to passing cars and operating means therefor, the dispatch and delivery stations being each provided with an interlock adapted to render its station mechanism operating means inoperative when the system requirements for the dispatch and the delivery of loads are unsatisfied.

11. In a conveyer system, the combination of load conveying cars, means for propelling the cars in an endless path of travel, a dispatch and a plurality of delivery stations adjacent the path of the car travel, the dispatch station including mechanism movable into and out of a load transfer position with reference to passing cars, the cars each carrying an assembly of tabs shiftable as a unit from an inactive to an active position and including a plurality of settable tabs each corresponding to a particular delivery station and being mounted so as to be set only when the assembly thereof is in its active position, said dispatch station including means responding to the approach of a car having its tab assembly in inactive position for actuating the station mechanism thereof to its load transfer position aforesaid thereby to effect dispatch of a ready load, means for shifting the tab assembly of said car to its active position, and selecting means for setting a tab of the car assembly thereof which corresponds to the particular delivery station for which the ready load is destined.

12. In a conveyer system, the combination of load conveying cars, means for propelling the cars along an endless path of travel, a dispatch and a plurality of delivery stations each having station mechanism movable into and out of load transfer position with reference to passing cars, each car carrying an assembly of tabs shiftable as a unit from an inactive to an active position and the tabs thereof each corresponding to a particular delivery station and being mounted to be set only when said assembly is in its active position, the dispatch station including means responding to the approach of a car having its tab assembly in inactive position for actuating the station mechanism thereof to its load transfer position as aforesaid thereby to effect dispatch of a ready load, means for shifting the tab assembly of said car to its active position, and selecting means for setting a tab of the car assembly thereof which corresponds to the particular delivery station for which the ready load is destined, the delivery stations each including an individual station, device adapted to be engaged by a set car tab corresponding thereto, means controlled by said device for actuating the station mechanism thereof to its load transfer position aforesaid thereby to effect load delivery, and means for resetting the tab assembly of the car to its inactive position following delivery of a load therefrom.

13. In a vertical conveyer system, the combination of an endless chain having ascending and descending runs with end turns, driving means therefor, load carriers traveling with said chain, a dispatch station for transferring loads to said carriers and a plurality of delivery stations adjacent the path of carrier travel for receiving said loads, the delivery stations being disposed adjacent both the ascending and descending chain runs, the load carriers each including a car body secured to the chain and a back plate mounted for turning movement relative thereto, means carried by the back plate of each carrier for receiving a selection corresponding to the destination of a load transferred thereto by said dispatch station, and means for maintaining the car bodies horizontal and for causing the back plates and the selection receiving means to reverse position with reference to the car bodies in making end turns.

14. In a vertical conveyer system, the combination of an endless chain having ascending and descending runs with end turns, driving means therefor, load carriers traveling with said chain, a dispatch station for transferring loads to said carriers and a plurality of delivery stations adjacent the path of car travel for receiving loads from said carriers, the delivery stations being disposed adjacent both the ascending and descending chain runs, the load carriers each including a car body secured to the chain and a back plate mounted for turning movement relative thereto, a tab assembly carried by the back plate of each carrier, means maintaining the cars horizontal and for causing their back plates to turn up-side-down or right-side-up in making the end turns, means at the dispatch station for transferring an operator's selection corresponding to the destination of a load being transferred by said dispatch mechanism to the tab assembly of the carrier receiving said load, and means operative upon the arrival thereat of a carrier bearing a load destined thereto for effecting delivery of the load at the selected delivery station.

15. In a vertical conveyer system, the combination of an endless conveyer chain having ascending and descending runs, driving means therefor, load conveying cars for travel with the chain in an endless path, a dispatch and a delivery station adjacent each of the ascending and descending runs, the dispatch station on the ascending side and the delivery station on the descending side each having mechanism reciprocable into and out of load transfer position with reference to a passing car, the delivery station on the ascending side and the dispatch station on the descending side each including mechanism rotatable about an axis into and out of a load transfer position with reference to a passing car, and a differential drive unit for all said stations, including a driving gear continuously driven from said chain, divided shafts, a normally ineffective driving connection between the driving gear and each of said shafts, driven elements rotating with said driving gear, a drive transmitting connection between each of the divided shafts and a reciprocating station mechanism, and a normally ineffective drive transmitting connection between each of said driven elements and a rotary station mechanism.

16. In a conveyer system, the combination of load conveying cars, means for propelling the cars along an endless path of travel, a dispatch station and a plurality of delivery stations adjacent the path of car travel, the dispatch station including mechanism movable into and out of the path of the cars for transferring thereto a load ready for dispatch, means for actuating said mechanism, selecting mechanism operatively related to said dispatch station including fully mechanical means for setting up a selection corresponding to the delivery station at which a ready load for dispatch is to be delivered and for automatically transferring the selection to an empty car passing said station, and an interlock operative in part by said selecting mechanism for rendering the station mechanism actuating means inoperative upon failure of the operator to make a selection.

17. In a conveyer system, the combination of load conveying cars each having means for receiving a selection corresponding to the destination of loads conveyed thereby, means for propelling the cars along an endless path of travel, a dispatch station and a plurality of delivery stations adjacent the path of car travel, the dispatch station including mechanism movable into and out of the path of the cars for transferring thereto a load ready for dispatch, means for actuating said mechanism, selecting mechanism operatively related to said dispatch station including push buttons corresponding to the several delivery stations, and a station assembly of devices each mechanically connected to a push button and operative to transfer the operator's selection represented by his actuation of a push button to the selection receiving means of an empty car passing said station, and an interlock operative in part by said selecting mechanism for rendering the station mechanism actuating means inoperative upon failure of the operator to make a selection.

18. In a conveyer system, the combination of load conveying cars each having means for receiving a selection corresponding to the destination of loads conveyed thereby, means for propelling the cars along an endless path of travel, a dispatch station and a plurality of delivery stations adjacent the path of car travel, the dispatch station including mechanism movable into and out of the path of the cars for transferring thereto a load ready for dispatch, means for actuating said mechanism, selecting mechanism operatively related to said dispatch station including fully mechanical means for setting up a selection corresponding to the delivery station to which a load ready for dispatch is to be delivered and for automatically transferring the selection to the selection receiving means of an empty car passing said station, and reset means which is both automatically operable following transfer of the selection as aforesaid and manually operable by the operator for the revision of a previously made selection.

19. In a conveyer system, the combination of an endless chain having driving means therefor, load conveying cars traveling with the chain in an endless path, the cars each having means for receiving a selection corresponding to the destination of loads carried thereby, a dispatch station and a plurality of delivery stations disposed adjacent the path of car travel, the delivery stations being arranged on both the ascending and descending chain runs, the dispatch station including mechanism movable into and out of the path of car travel to transfer to a passing car a load ready for dispatch, means for actuating said mechanism, and selecting mechanism operatively related to said dispatch station including a panel, a row of push buttons along one side thereof each corresponding to a delivery station on the ascending chain run, a row of push buttons along the other side of the panel each corresponding to a delivery station on the descending chain run, and a station assembly of devices each operatively connected to a push button and operative to transfer the operator's selection as represented by the actuation of a push button to the selection receiving means of an empty car passing said station.

20. In a conveyer system, the combination of an endless chain having ascending and descending runs, driving means therefor, load conveying cars traveling with the chain in an endless path, dispatch stations located on the same floor level one for the ascending chain run and the other for the descending chain run, a plurality of delivery stations adjacent both the ascending and the descending chain runs, the dispatch stations each including mechanism movable into and out of the path of car travel to transfer to a passing car a load ready for dispatch, means for actuating said mechanism, and selecting means operatively related to both said dispatch stations including a panel, a first row of push buttons along one side thereof each corresponding to a delivery station above the dispatch station on the ascending chain run, a second row of push buttons along the other side of the panel each corresponding to a delivery station below the dispatch station on the descending chain run, a first station assembly of devices each operatively connected to the push buttons of the first row thereof for transferring the operator's selection as represented by the actuation of a push button of that row to cars passing the dispatch station on the ascending chain run, and a second station assembly of devices each operatively connected to the push buttons of the second row thereof for transferring the operator's selection represented by actuation of a push button of the second row to cars passing the dispatch station on the descending chain run.

21. In a conveyer system, the combination of load conveying cars, means for propelling the cars along an endless path of travel, a dispatch station and a plurality of delivery stations adjacent the path of car travel, the dispatch station including mechanism movable into and out of the path of car travel for transferring to a passing car a load ready for dispatch, means for actuating said mechanism, and multiple selecting mechanism operatively related to said dispatch station and including means for setting up a succession of selections for a succession of loads ready for dispatch, each setting of the succession thereof corresponding to a particular load of the succession thereof and to the delivery station to which that load is to be delivered, and means mechanically interlocking the mechanism actuating means and the selecting mechanism so that the dispatch station mechanism is operated once for each selection of the succession thereof and said selections are rendered active in the order of the loads to which they correspond and in response to the actuations of the dispatch station mechanism.

22. In a conveyer system, the combination of load conveying cars, means for propelling the cars along an endless path of travel, a dispatch station and a plurality of delivery stations adjacent the path of car travel, the dispatch station including mechanism movable into and out of the path of car travel for transferring to a passing car a load ready for dispatch, means for actuating said mechanism, multiple selecting mechanism operatively related to said dispatch station including a rotary drum-like member divided into circumferential drum lanes each corresponding to a particular delivery station, a plurality of settable selecting elements spaced in circumferential series along each drum lane and arranged in cross rows each corresponding to a load of a succession thereof ready for dispatch, and a station assembly of devices operative to transfer the element settings to cars passing the station, and means interrelating the mechanism actuating means and the selecting mechanism whereby the dispatch station mechanism is operated once for each element setting upon the latter being rendered active and whereby the drum is advanced a distance corresponding to the distance between cross rows of elements in response to each actuation of the station mechanism to render the element settings successively active.

23. In a conveyer system, the combination of an endless chain having ascending and descending runs, driving means therefor, load conveying cars traveling with the chain in an endless path, dispatch stations located on the same floor level one for the ascending chain run and the other for the descending chain run, a plurality of delivery stations adjacent both the ascending and the descending runs, the dispatch stations each including mechanism movable into and out of the path of car travel to transfer to a passing car a load ready for dispatch and means for actuating said mechanism, multiple selecting mechanisms operatively related to said dispatch stations each including a sectional drum-like member, one drum section being divided into circumferential lanes each corresponding to a particular one of the delivery stations located above the dispatch station on the ascending run, the other drum section being divided into circumferential lanes each corresponding to a particular one of the delivery stations located below the dispatch station on the descending chain run, all said lanes carrying settable selecting elements spaced in circumferential series and arranged in cross rows each corresponding to a load of a succession thereof ready for dispatch, a station assembly of devices operative to transfer the element settings corresponding to selected delivery stations on the ascending run to ascending cars, a station assembly of devices operative to transfer the element settings corresponding to selected delivery stations on the descending run to descending cars, and means interrelating the operation of the drum sections and the station operating mechanisms whereby the settings of the succession thereof are rendered active in the order of the loads to which they correspond.

24. In a vertical conveyer system, the combination of an endless conveyer chain, driving means therefor, a plurality of load carriers movable with the chain, and station mechanism movable into and out of load transfer position with reference to carriers passing the same, the station mechanism comprising an arm mounted for rotary movement about a fixed axis extending through one end thereof, a shelf carried by said arm and being mounted for rotary movement relative to said arm about an axis extending through the other end thereof, and means for rotating said arm and simultaneously therewith for imparting relative rotary movement to said shelf as required to maintain the latter horizontal.

SAMUEL LIPPINCOTT GRISWOLD KNOX.